United States Patent [19]

Izumi et al.

[11] Patent Number: 5,218,399
[45] Date of Patent: Jun. 8, 1993

[54] DISPLAY SYSTEM FOR CAMERA HAVING SEGMENT DISPLAY PORTION AND DOT MATRIX DISPLAY PORTION

[75] Inventors: Shuji Izumi; Toshihiko Ishimura; Tatsuya Ishida; Noriyuki Ishii; Hiroshi Yoshino; Katsuyuki Nanba; Hirokazu Kuroda, all of Osaka, Japan

[73] Assignee: Minolta Camera Kabushiki Kaisha, Osaka, Japan

[21] Appl. No.: 784,064

[22] Filed: Oct. 30, 1991

Related U.S. Application Data

[63] Continuation of Ser. No. 544,243, Jun. 26, 1990, abandoned.

[30] Foreign Application Priority Data

Jun. 26, 1989 [JP] Japan ................................. 1-163091

[51] Int. Cl.[5] .................................................. G03B 17/18
[52] U.S. Cl. ..................................... 354/471; 354/484
[58] Field of Search ............... 354/484, 412, 465, 471, 354/474, 475, 289.1, 289.12

[56] References Cited

U.S. PATENT DOCUMENTS

| | | | |
|---|---|---|---|
| 4,465,355 | 8/1984 | Murakami et al. | 354/475 |
| 4,589,754 | 5/1986 | Maitani et al. | 354/474 |
| 4,692,760 | 9/1987 | Unno et al. | 340/752 |
| 4,764,766 | 8/1988 | Aoyama et al. | 340/784 |
| 4,839,636 | 6/1989 | Zeiss | 340/752 |
| 4,847,651 | 7/1989 | Izumi et al. | 354/471 |
| 5,170,204 | 12/1992 | Mukai | 354/409 |

FOREIGN PATENT DOCUMENTS 60-28634 2/1985 Japan.
62-31837 2/1987 Japan.

OTHER PUBLICATIONS

User's Manual "Canon Technical Back E", Canon Inc. 1987.
User's Manual "Minolta Program Back Super 90/70", Minolta Camera Kabushiki Kaisha.

Primary Examiner—W. B. Perkey
Attorney, Agent, or Firm—Willian Brinks Olds Hofer Gilson & Lione

[57] ABSTRACT

A display system for a camera that includes both a segment display portion and a dot matrix display portion. The two different display systems are driven by different duty ratios for assuring clearer presentation and quicker recognition by the photographer. The disclosure also includes an energy-saving control system for such a combination display system where the more energy-consuming dot matrix portion is stopped operating while the less energy-consuming segment portion remains operation after a predetermined time since the last operation of any switch of the camera. The disclosure further includes an elaborate analog display that clearly shows exposure parameters of the camera.

14 Claims, 28 Drawing Sheets

A: SELECTING SIGNAL
B: NON SELECTING SIGNAL

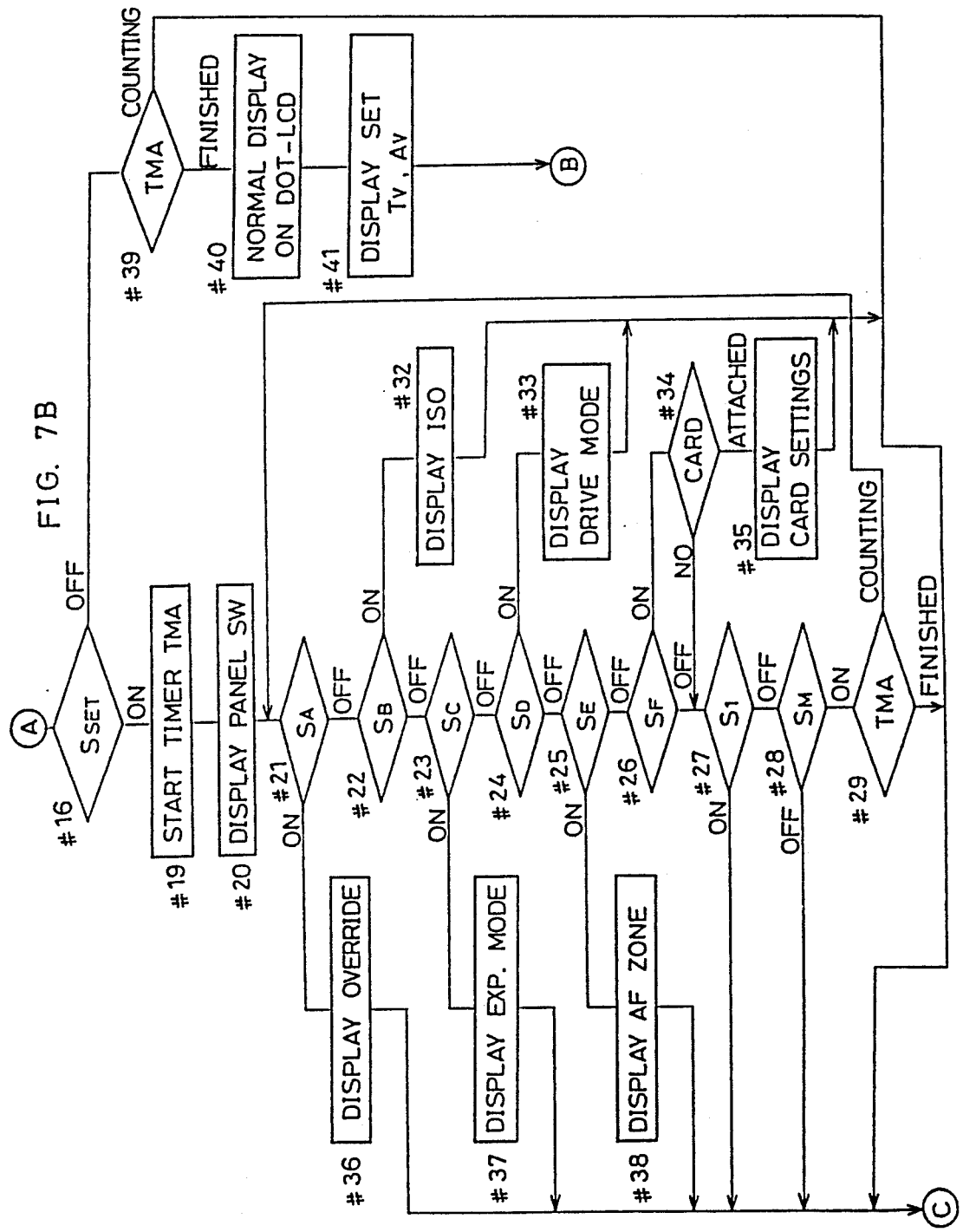

DISPLAY SYSTEM FOR CAMERA HAVING SEGMENT DISPLAY PORTION AND DOT MATRIX DISPLAY PORTION

This application is a continuation of application Ser. No. 07/544,243, filed Jun. 26, 1990, now abandoned.

BACKGROUND OF THE INVENTION

1. Field of the invention

The present invention relates to a display system, especially that for a camera system.

2. Prior art

Film speed is one of parameters that is necessary to determine an exposure condition of a photographing. An automatic film speed reading mechanism is already known where the film speed of a film is printed on the film cartridge (DX code) and an array of electric contact points provided in a camera body detects the film speed. For skillful photographers, a manual film-speed setting switch (or dial) is provided on some types of camera to override the automatically read film speed value.

Besides film speed, there are many parameters that affect an exposure condition, e.g., aperture value, shutter speed, exposure override setting, etc. These parameters should be displayed on the camera body (or on an attachment of the camera such as a special back cover of the camera body) so that the photographer could expect the exposure condition of the picture. There are two types of displays: one is a dot matrix display and the other is a segment display. The dot matrix display is composed of a two-dimensional array of a large number of small dots (pixels), and the segment display is composed of a comparatively small number of segments which have normally certain predetermined shapes. The dot matrix display is versatile (i.e., gives a large freedom of presentation) but consumes more energy. The segment display is not so versatile in presentation but consumes less energy. Some cameras use both display systems (dot matrix and segment displays) in one body.

SUMMARY OF THE INVENTION

An object of the present invention is to provide a display system for a camera system that elaborately displays information about exposure settings (especially the film speed) so that the photographer can recognize the exposure condition instantaneously even by a glance.

Another object of the present invention is to provide a control system for a combination of dot matrix display portion and segment display portion that reduces the total energy consumption while giving the photographer necessary information at all time.

Further object of the present invention is to provide another control system for such a combined display system that enhances visibility of both the dot matrix display portion and segment display portion.

In order to achieve the first object, a camera according to the present invention comprises: reading means (such as the DX-code detector) for automatically reading a film speed of a film loaded in the camera; setting means for manually setting a film speed; and display means for displaying a difference between the film speed automatically read by the reading means and the film speed manually set by the setting means. The photographer can instantaneously and easily expect the effect of his manual film-speed setting because the film-speed difference on the display teaches him the bias (shift) of the exposure condition from the normal (optimal) condition determined by the automatically set value.

For the second object, a display apparatus according to the present invention comprises: first display (e.g., a segment display portion of the combined display); second display that consumes more energy than the first display (a dot matrix display); first driver for driving the first display; second driver for driving the second display; timer for counting a predetermined time period; and controller for controlling the second driver so that the second driver stops driving the second display after the predetermined time period. By displaying minimum all-time necessary information by the first display that consumes less energy, the photographer is kept informed all time and the total energy consumption is reduced greatly.

In order to achieve the third object, a display apparatus according to the present invention comprises: first display for displaying information by means of a plurality of display segments; second display for displaying information by means of a dot matrix; and a driver for driving the first display and the second display with different duty ratios. Normally, the duty ratios for the two displays are selected so that the duty ratio for the segment display is larger than that for the dot matrix display for clearer visibility of the respective displays.

The present invention includes other various features, which are described in the detailed description of the embodiments that follow.

BRIEF DESCRIPTION OF THE ATTACHED DRAWINGS

FIGS. 7A and 7B are flowcharts integrally showing the main routine of the controller of the camera system.

DETAILED DESCRIPTION OF THE PREFERRED EMBODIMENTS

Hardware construction

Figure 1:
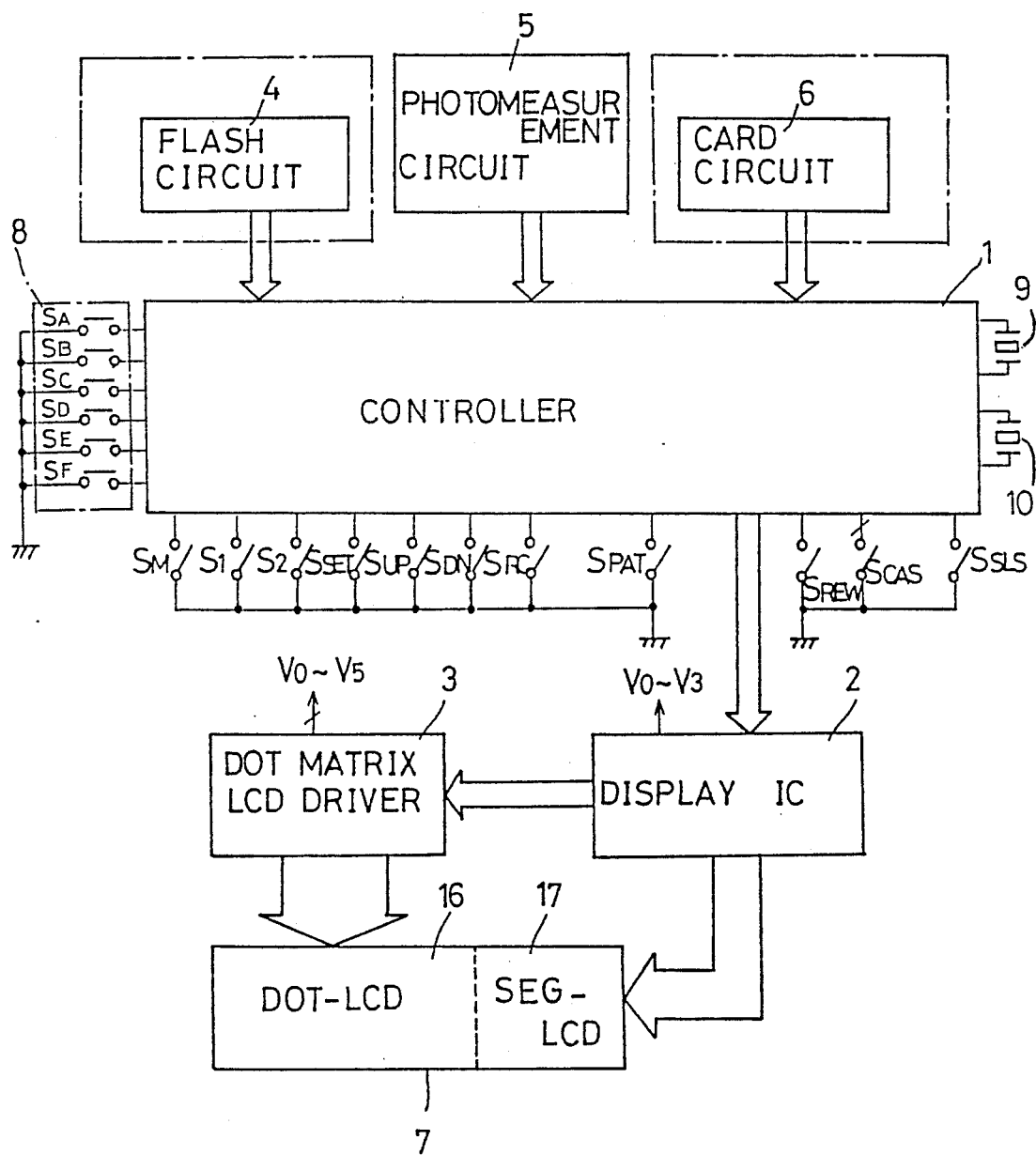
FIG. 1 is an electric block diagram of the camera system including accessories.

The main controller 1 shown in FIG. 1 includes a microcomputer and controls the entire camera system. The controller 1 is connected to a photomeasurement circuit 5 provided in the camera body, and a flash circuit 4 or a card circuit 6 when a flash unit or an IC card is attached to the camera body. The card circuit 6 includes a microcomputer. The controller 1 receives the guide number data from the flash circuit 4, the photomeasurement data from the photomeasurement circuit 5, and card data from the card circuit 6.

Figure 3:
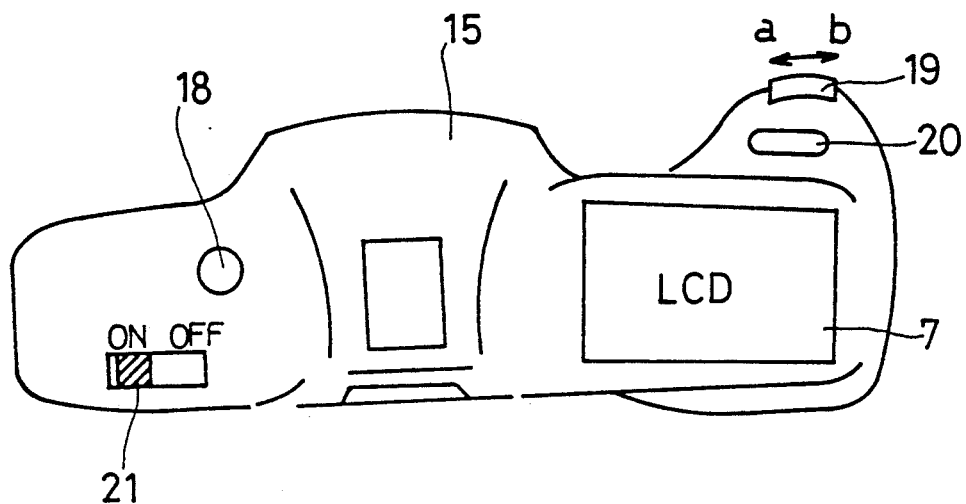
FIG. 3 is a plan view of a camera body.

The controller 1 is also connected to a display IC 2 and sends various display data to the display IC 2. The display IC 2 includes a microcomputer to control a liquid crystal display (LCD) panel 7. The LCD panel 7 is placed at the right-hand side of the top of the camera body 15 as shown in FIG. 3. As detailed in FIG. 4, the LCD panel 7 is composed of two parts: a dot matrix part (DOT-LCD) 16 including a two-dimensional array of dots, and a segment part (SEG-LCD) 17 including arranged segments.

Figure 4:
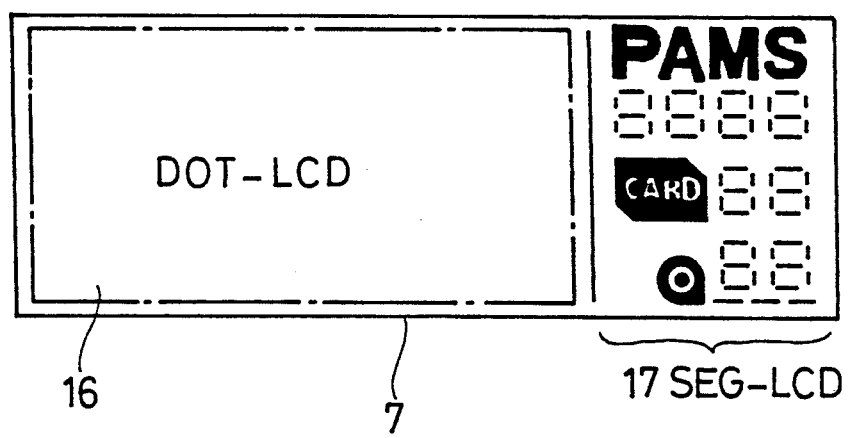
FIG. 4 is a plan view of a liquid crystal display (LCD) panel provided on the top of the camera body.

Returning to FIG. 1, the display IC 2 further includes an internal LCD driver to drive the segment part 17 of the LCD panel 7. The display IC 2 controls the dot matrix part 16 of the LCD panel 7 by using an external LCD driver IC 3. The two parts 16, 17 are placed adjacent in the LCD panel 7, as shown in FIG. 4.

The reason why the LCD panel 7 includes two different display systems is now explained. The dot matrix LCD can present almost any pattern, but it requires a large number of tiny dots to make an eloquent presentation. This leads to a broader display area and higher driving voltage, which further leads to larger energy consumption. When a large battery with a big energy capacity is not allowed, it is not proper to always energize the dot matrix LCD. In some LCD systems for a camera, the dot matrix LCD is stopped when the camera is not operated for a predetermined time period. But there are some kinds of information (e.g., a frame counter) that need to be always displayed in a camera system. The two-part LCD system of the present embodiment addresses the problem. The dot matrix LCD part 16 is used to display various kinds of information that require subtle expression, and the segment LCD part 17 is used to display the full-time information.

The different physical characteristics of the dot matrix LCD and the segment LCD is another reason to adopt the two LCDs. Since the dot matrix LCD includes a lot of pixels (dot elements), it originally requires a number of terminals corresponding to the number of pixels. In order to avoid the wiring complexity and the resultant low reliability and high cost, the duty control method is devised to drive a lot of pixels of a dot matrix LCD using a time-division driving signals. As the number of pixels increases, or as the number of terminals decreases, the duty ratio of the time-division signal should be reduced. But as the duty ratio becomes smaller, the contrast of the presentation on the LCD panel becomes dimmer. Therefore, such kinds of information that need be perceived quickly and assuredly at a shutter chance (e.g., the shutter speed or the aperture value) are preferably displayed on the segment LCD which can be driven by high-duty-ratio driving signals and can show conspicuous signs, rather than the low-contrast dot matrix LCD.

Figure 2A:
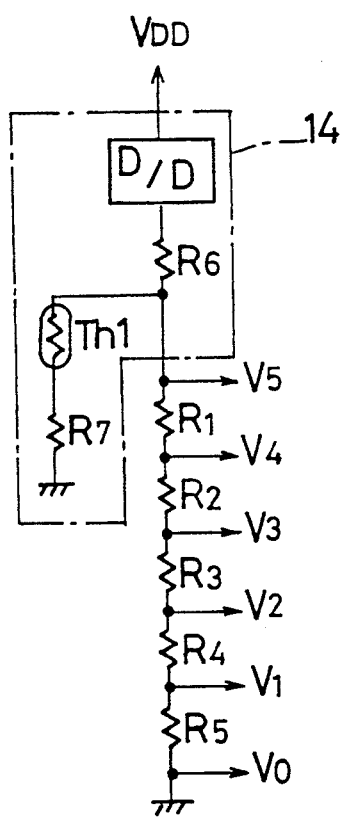
FIG. 2A is a circuit diagram of the display power source circuit.
Figure 5A:
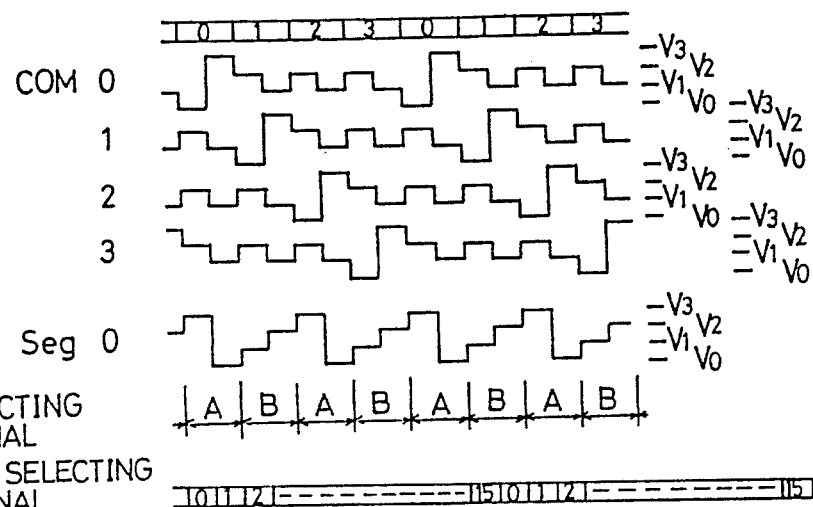
FIG. 5A is a timing chart of the driving signal of the segment part of the LCD panel.
Figure 5B:
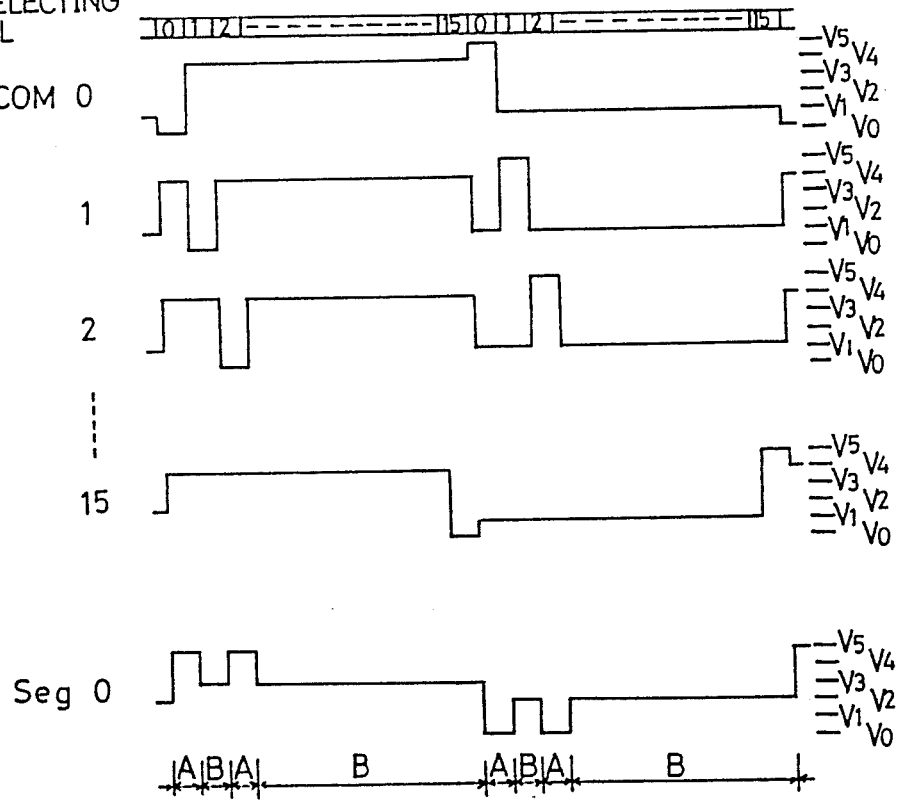
FIG. 5B is a timing chart of the driving signal of the dot matrix part of the LCD panel.

The segment part 17 of the LCD panel 7 is driven by $\frac{1}{4}$-duty $\frac{1}{3}$-bias driving signals as shown in FIG. 5A, and the dot matrix part 16 is driven by 1/16-duty 1/5-bias driving signals as shown in FIG. 5B. In the time-dividing signals shown in FIGS. 5A and 5B, the period denoted by A is the selecting period in which the pertinent pixel can be displayed, and the period B is the non-selecting period in which the pertinent pixel is not displayed. The voltage steps ($V_0$, $V_1$, $V_2$ and $V_3$ in FIG. 5A, and $V_0$, $V_1$, $V_2$, $V_3$, $V_4$ and $V_5$ in FIG. 5B) of the driving signals are derived from the circuit of FIG. 2A, in which the voltages $V_0$ through $V_5$ are produced by dividing the voltage $V_5$ output from the LCD source circuit 14 by the resistances $R_1$ through $R_5$. To the internal LCD driver within the display IC 2 are supplied the voltages $V_0$ through $V_3$ to drive the segment part 17, and to the external LCD driver IC 3 are supplied the voltages $V_0$ through $V_5$ to drive the dot matrix part 16. The LCD source circuit 14 is composed of a thermistor $Th_1$ for compensating for the temperature change, resistances $R_6$ and $R_7$ for coefficient adjustment and a DC/DC converter. Since the optimal driving voltage of the liquid crystal decreases as the temperature increases, the negative coefficient thermistor $Th_1$ is used to compensate for the temperature change. The DC/DC converter stabilizes the driving voltages $V_0$ through $V_5$ irrespective to the fluctuation in the source voltage $V_{DD}$.

Figure 6:
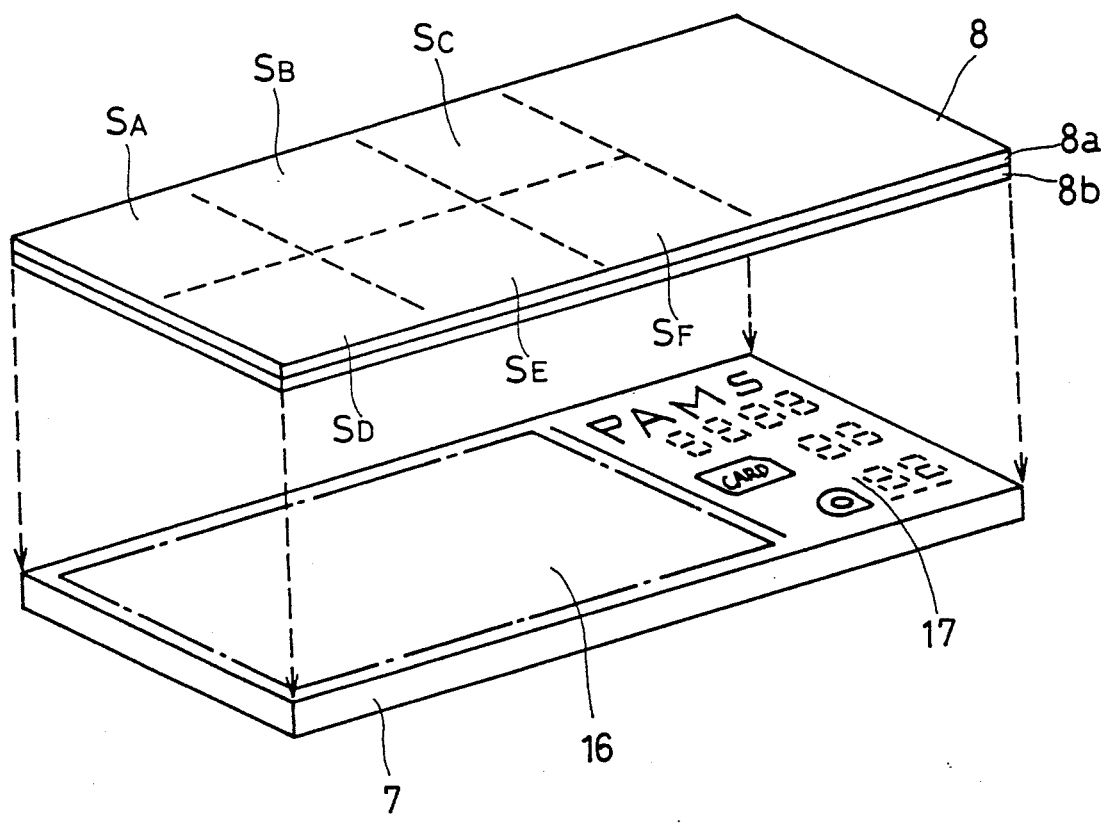
FIG. 6 is a broken perspective view of the LCD panel including a panel switch.

At the top of the LCD panel 7 is placed a transparent panel switch 8, as shown in FIG. 6. The panel switch 8 is composed of an upper plate 8a and a lower plate 8b clad together, and the panel switch 8 has six switch regions $S_A$, $S_B$, $S_C$, $S_D$, $S_E$ and $S_F$ (also see FIG. 1) on the dot matrix part 16.

Returning to FIG. 1, many switches are connected to the controller 1 to effect various functions of the camera. Every switch function is described here referring to FIG. 3.

$S_M$=Main switch. When the main switch 21 is slid to the left, the main switch $S_M$ turns on and the camera is ready to operate various functions.

$S_1$=Photomeasurement switch. When the operating button 20 is half pressed, the photomeasurement switch $S_1$ turns on.

$S_{SET}$=Set switch. When the set switch 18 is pressed, various settings about the camera functions can be made. The switch 18 turns on while pressed, and turns off when released.

$S_{UP}$=Up switch. In various setting operations, the switch $S_{UP}$ is used to increase the value, or to change the value in one direction.

$S_{DN}$=Down switch. In various setting operations, the switch $S_{DN}$ is used to decrease the value, or change the value in the opposite direction. When the slide switch 19 is pressed to the right (direction b in FIG. 3), the up switch $S_{UP}$ turns on, and when the slide switch 19 is pressed to the left (direction a), the down switch $S_{DN}$ turns on. When the slide switch 19 is released, the switch 19 returns to the center.

$S_{RC}$= Back cover switch. When the back cover of the camera body 15 is closed, the switch $S_{RC}$ turns off.

$S_{PAT}$= Film cartridge switch. When a film cartridge is loaded in the camera body 15, the switch $S_{PAT}$ turns on.

$S_{CAS}$= DX code detecting switch. The switch $S_{CAS}$ is composed of contact points, and a DX code printed on a film cartridge (which indicates the film speed) is read by the contact points.

$S_{REW}$= Film rewinding switch. The switch $S_{REW}$ is used to rewind the film.

$S_{SLS}$= Spool switch. When the leader of the film is wound on the spool, the switch $S_{SLS}$ turns off.

The controller 1 is connected to a clock oscillator 9 whose clock signal is delivered to the display IC 2 and the external LCD driver IC 3 for making the LCD driving signals. Another clock oscillator 10 is connected to the controller 1 to provide a system clock signal, which is also delivered to the display IC 2 and the external LCD driver IC 3 for the system clock.

Figure 2B:
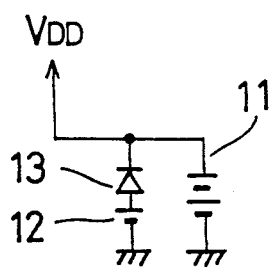
FIG. 2B is a circuit diagram of the normal battery and a temporary battery.

The source voltage $V_{DD}$ for these circuits is provided from the battery 11 shown in FIG. 2B. In order to prevent a power interruption when the battery 11 is replaced, a temporary battery 12 with a diode 13 is provided in the system.

Operations of the controller

Figure 7A:
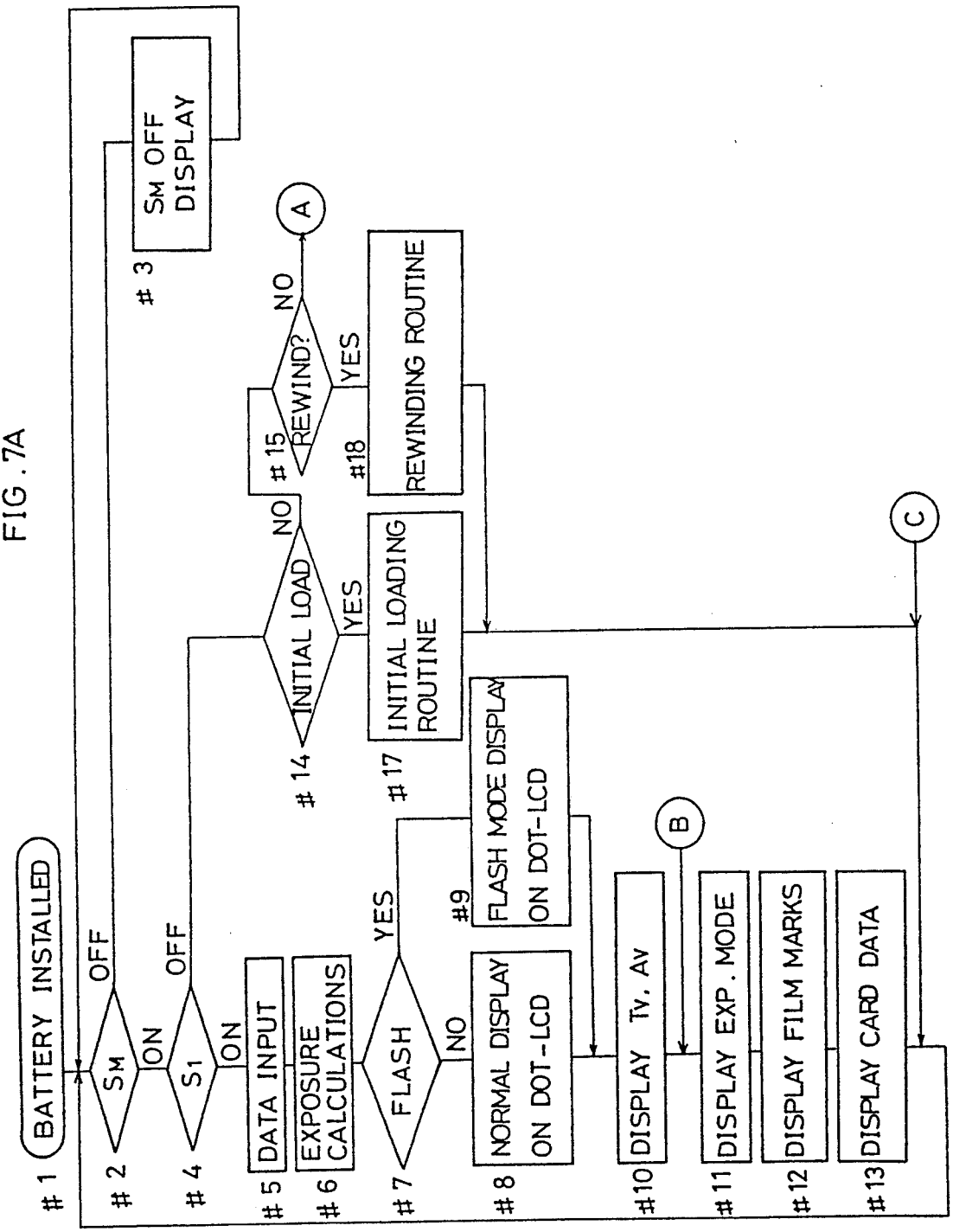
Figure 8A:
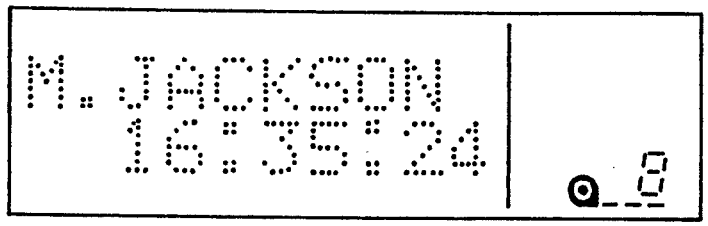
FIGS. 8A through 8Z are display examples of the LCD panel.

The operations of the controller 1 is now explained centering on the display. FIGS. 7A and 7B are flowcharts of the display-related routine executed by the controller 1. This routine is started when the battery 11 is installed in the camera body 15 (step #1). First, the main switch $S_M$ is checked at step #2. When the main switch $S_M$ is off, step #3 is processed where data indicative of "main switch is off" and data of the frame counter are sent to the display IC 2. When the display IC 2 receives these data, the display IC 2 sends data of a character string (detailed later) stored in a RAM and data of current time to the external LCD driver IC 3, and also outputs the data of the frame counter to the segment part 17 using the internal LCD driver. The external LCD driver IC 3 outputs the given character data and time data to the dot matrix part 16 of the LCD panel 7. The display which appears on the LCD panel 7 in this case is shown in FIG. 8A. The character string "M. Jackson" displayed at the above left is previously inputted by the owner or photographer of the camera for showing the ownership of the camera. The data of the current time "16:35:24" is made by counting up the clock signal generated by the system clock 10. The part bearing the character string and the current time is the dot matrix part 16. The right side part of the display panel 7 is the segment part 17 where the frame counter "8" (which shows that the film frame behind the lens is the eighth), a film cartridge mark (which shows that a film cartridge is loaded in the camera) and a film mark (which shows that the film is correctly wound on the spool) are displayed. That is the display when the main switch $S_M$ is off. The character string display may be used for any other purpose.

It is noted here again that the dot matrix part 16 is driven by the external LCD driver IC 3, but the display data of the dot matrix part 16 is given from the display IC 2. The display IC 2 directly drives the segment part 17. Thus, all display data including that on the dot matrix part 16 and that on the segment part 17 are given from the controller 1. Therefore, it may be expressed hereinafter that "the controller makes a display".

Figure 8B:
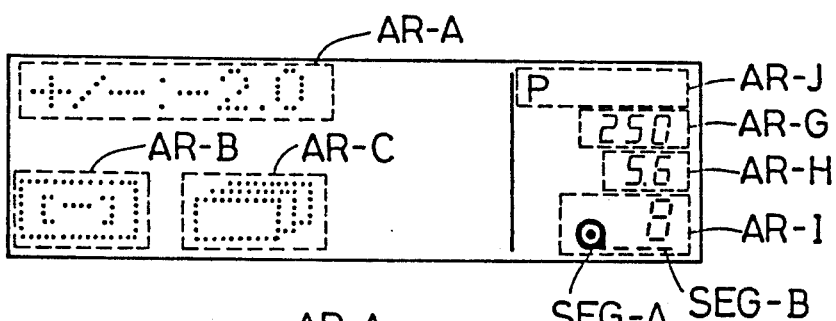
Figure 8C:
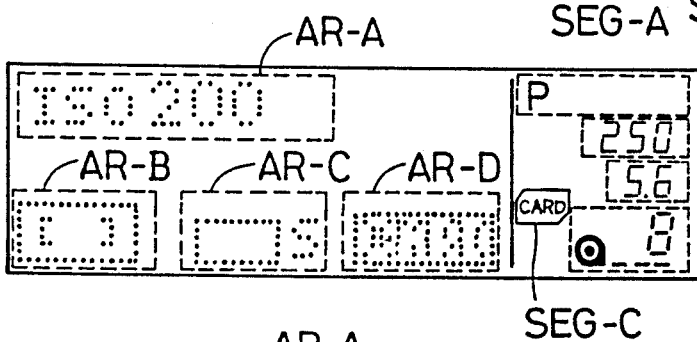
Figure 8D:
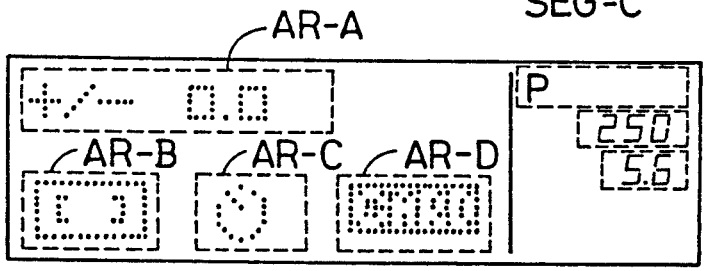

While the main switch $S_M$ is off, the process loops between steps #2 and #3. When the main switch $S_M$ is turned on, the process proceeds to step #4, where the photomeasurement switch $S_1$ is checked. When the photomeasurement switch $S_1$ is on, various data are inputted to the controller 1 at step #5. Specifically saying, photomeasurement data from the photomeasurement circuit 5, guide number data from the flash circuit 4, and card data from the card circuit 6. Then an exposure calculations are performed at step #6 according to the exposure control mode currently selected. The shutter speed Tv and the aperture value Av are calculated here. According to the exposure calculation results, it is determined at step #7 whether to conduct the available light photographing or flashlight photographing. When the available light photographing is determined, display data of various settings are sent to the display IC 2. The display examples in this case are shown in FIGS. 8B, 8C and 8D. The number in the upper area AR-A of the dot matrix part 16 shows the exposure override value. In FIG. 8B ("+/−:−2.0") the override is −2.0 Ev and in FIG. 8D ("+/−:0.0") no override is set. When another film speed is set different from that detected by the switch $S_{CAS}$ from the DX code on the film cartridge surface, the set film speed "ISO200" is displayed instead of the override value, as shown in FIG. 8C. In the lower left area AR-B is shown the currently effective AF (auto-focusing) zone mode. The symbol in FIG. 8B shows the spot AF zone mode, and that in FIGS. 8C and 8D shows the wide AF zone mode. The lower center area AR-C displays the frame advancing mode. The symbol in FIG. 8B shows the continuous advancing mode, that in FIG. 8C shows the single-frame advancing mode, and that in FIG. 8D shows the self-timer mode. The lower right area AR-D displays the state of the card-function selecting switch, which appears only when a card is attached to the camera body. FIGS. 8C and 8D show the display when a card is attached, and FIG. 8B shows the display when no card is attached. The word "CARD" is reversed here to effectively distinguish this display from the rest of the dot matrix part 16, and to remind the photographer that this is a display relating to a switch.

Figure 8E:
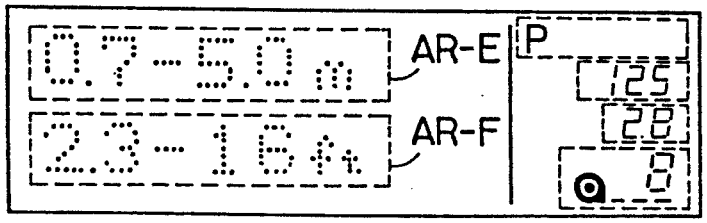

Returning to the flowchart of FIG. 7A, when a flashlight photographing is determined at step #7, various data relating to the flashlight photographing mode are displayed on the LCD panel 7, as shown in FIG. 8E. In this case, the dot matrix part 16 is divided into the upper area AR-E and the lower area AR-F. In these areas is displayed the recommended subject distance for the flashlight, in meters in the upper area AR-E "0.7–5.0 m", and in feet "2.3–16 ft" in the lower area AR-F. The distance is calculated from the guide number data from the flash circuit 4 and the minimum and maximum aperture value data from the lens both inputted at step #5. Precisely saying, the shortest distance is the quotient of the minimum guide number to the maximum aperture value, and the longest distance is the quotient of the maximum guide number to the minimum aperture value.

After either display at step #8 or step #9, the shutter speed Tv and the aperture value Av are displayed at step #10. As shown in FIGS. 8B–8E, the shutter speed Tv is shown in area AR-G second from the top of the segment part 17, and the aperture value Av is shown in area AR-H down next.

At the subsequent step #11, current exposure control mode is displayed in the top area AR-J of the segment part 17. As shown in FIG. 4, four capital letters are prepared in this area AR-J for the four exposure control modes: "P" for the program controlled automatic exposure mode, "A" for the aperture priority automatic exposure control mode, "M" for the manual exposure control mode, and "S" for the shutter speed priority automatic exposure control mode. One of them currently selected is displayed at step #11.

At the subsequent step #12, the frame counter and the film marks are displayed in the bottom area AR-I of the segment part 17. The "film marks" here includes two segments SEG-A (film cartridge mark) and SEG-B (film mark), and neither is displayed when a film cartridge is not in the camera body.

Then the card function is checked and displayed at step #13. When the card function is on, the segment SEG-C "CARD" is displayed as shown in FIG. 8C. When no card is attached to the camera body (FIG. 8B), or when the card function is off while a card is attached to the camera (FIG. 8D), the segment SEG-C is not displayed. After step #13, the process returns to step #2.

Figure 10:
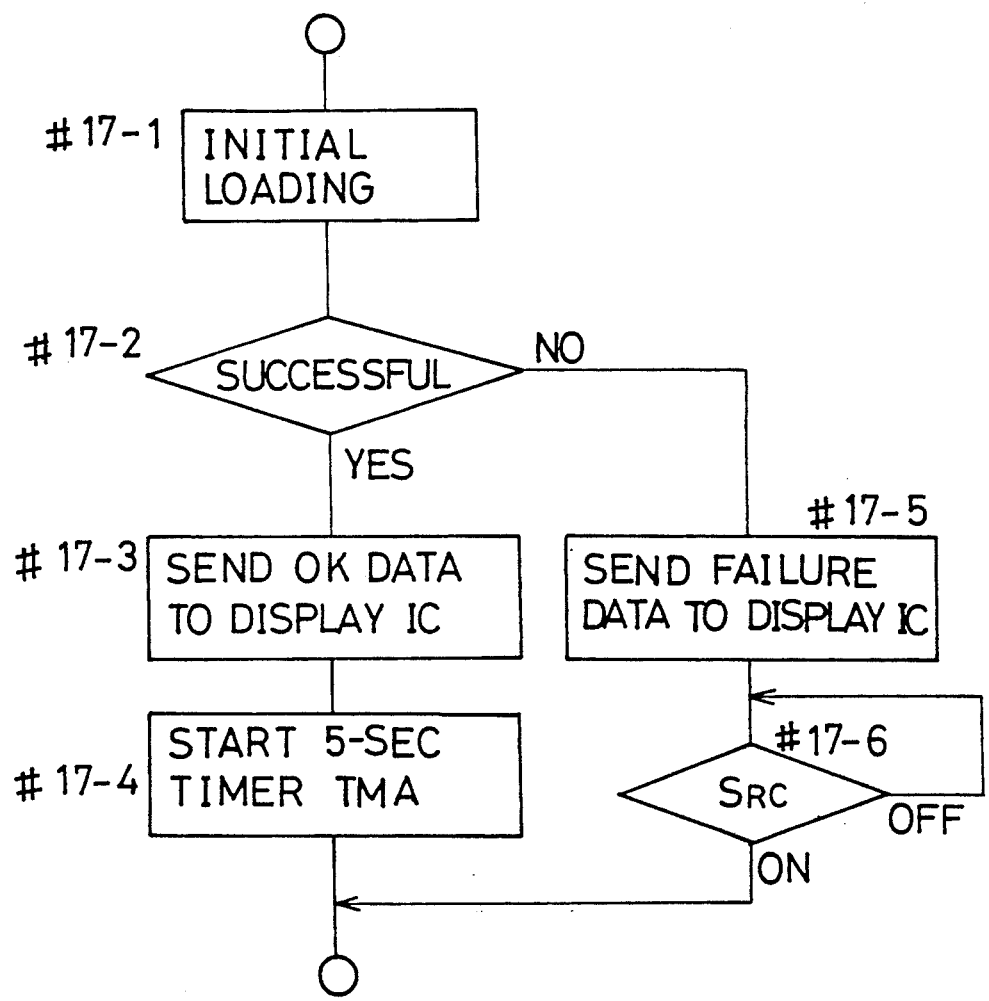
FIG. 10 is a flowchart for displaying the initial loading results.

When the photomeasurement switch $S_1$ is off at step #4, it is determined at step #14 whether to make the initial loading. The initial loading is the first winding action of the film loaded in the camera body. When: a) the back cover switch $S_{RC}$ has turned to off (back cover is closed) this time from on (back cover is open) last time, and b) the cartridge detecting switch $S_{PAT}$ is on, the initial loading condition is satisfied. When this condition is satisfied, the initial loading related process is executed at step #17, which is detailed referring to FIG. 10.

Initial loading

Figure 8F:
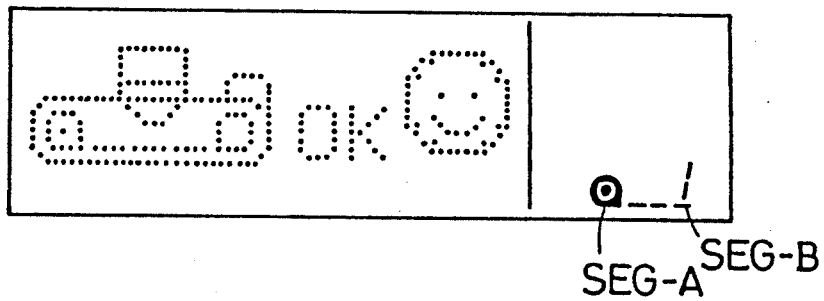

First the film motor is driven to initially wind up the film at step #17-1. Then the spool switch $S_{SLS}$ is checked at step #17-2 to determined whether the film is correctly wound on the spool. When the initial film loading is successfully completed, display data indicative of the initial loading completion (OK data) is sent to the display IC 2 at step #17-3, whereby the display as shown in FIG. 8F is made to indicate the successful completion of the film loading. At this time, the frame counter is reset to "1", and the film mark segments SEG-A and SEG-B are displayed. Then a five-second timer TMA is started at step #17-4, and the process returns to step #2 of FIG. 7A. The five-second timer is for counting the time period for lasting the display, and in this case it stops counting when the main switch $S_M$ is turned off or when the photomeasurement switch $S_1$ is turned on. The five-second timer is detailed later at step #39.

Figure 8G:
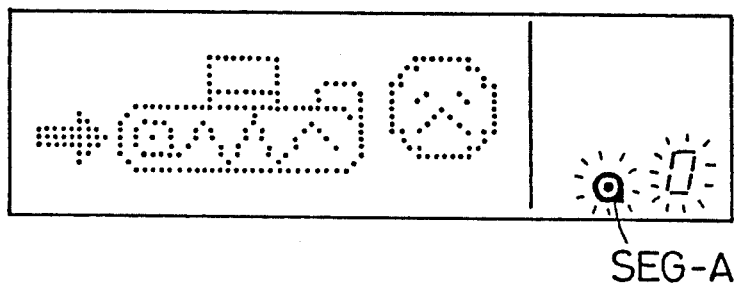

When it is determined at step #17-2 that the initial loading is unsuccessful, display data indicating the initial loading failure is sent to the display IC 2 at step #17-5, whereby the display as shown in FIG. 8G is made to urge the user to reload the film. This time, the frame counter is made "0" and the frame counter and the film cartridge mark (segment SEG-A) are made to blink. The film mark segment SEG-B is not displayed. The arrow shown in the dot matrix part 16 is for prompting the user to open the back cover. The process waits at step #17-6 until the back cover is opened. When the back cover is opened, i.e., when the back cover switch $S_{RC}$ turns on, the process returns to step #2 of FIG. 7A.

Figure 11:
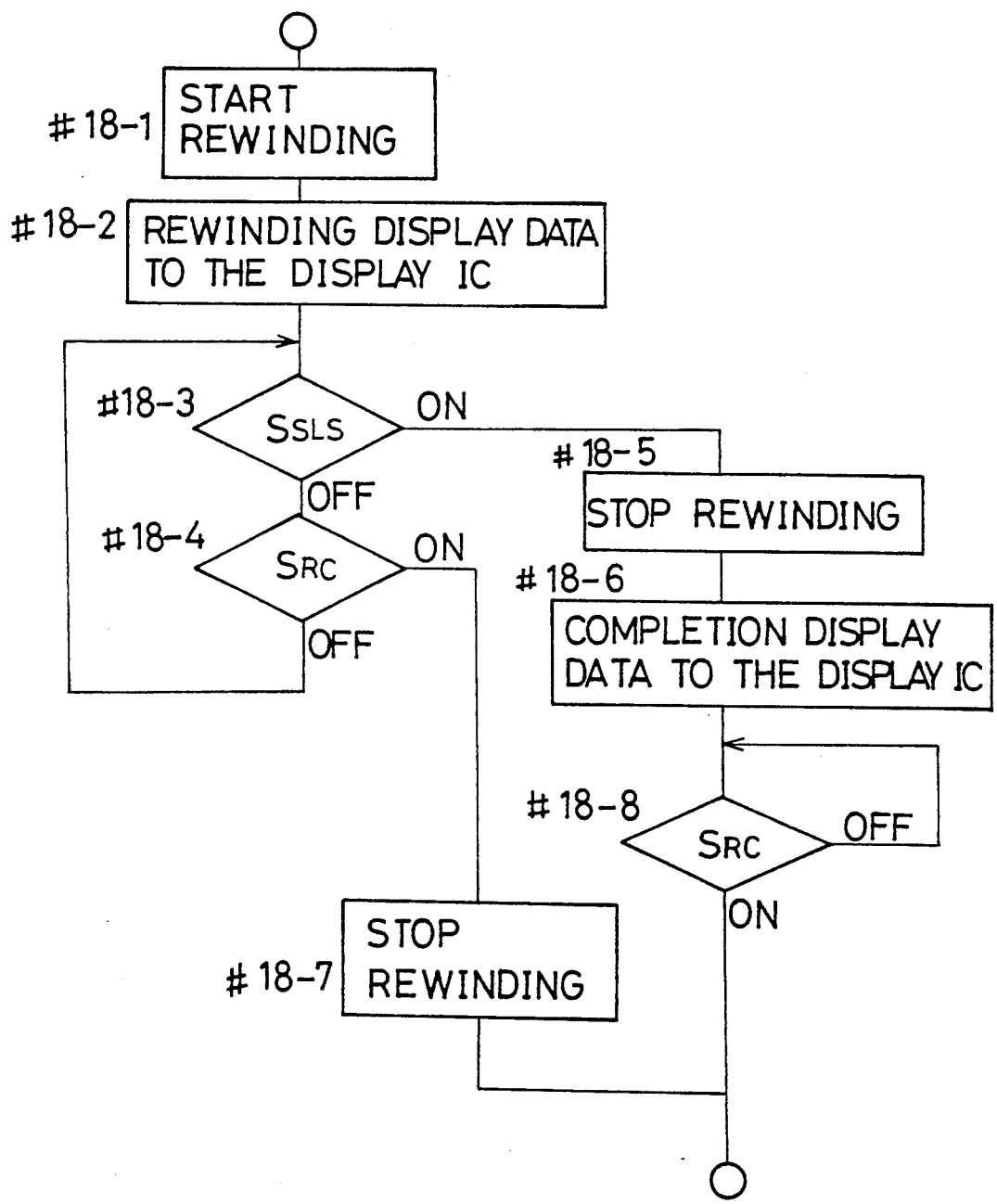
FIG. 11 is a flowchart for displaying the rewinding process.

When the initial loading condition is not satisfied at step #14, the film rewind switch $S_{REW}$ is checked at step #15. When the film rewind switch $S_{REW}$ is on and the film cartridge switch $S_{PAT}$ is on (i.e., a film is in the camera body), a film rewinding process is executed at step #18, which is detailed by the flowchart of FIG. 11.

Film rewinding

Figure 8H:
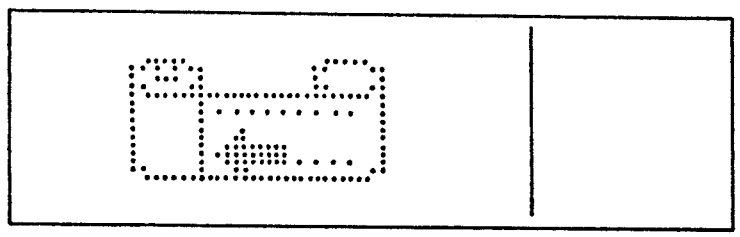
Figure 8I:
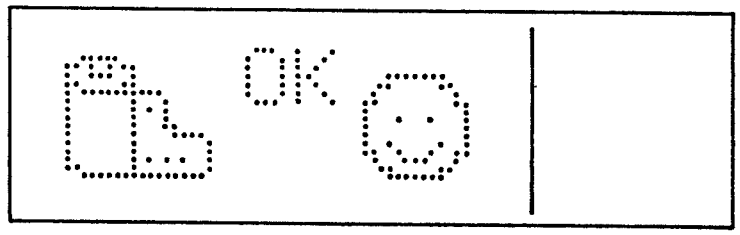

First at step #18-1, the film rewinding motor is started to rewind the film. At the subsequent step #18-2, the display as shown in FIG. 8H is made to show that the film rewinding process is under way. Then the spool switch $S_{SLS}$ is checked at step #18-3 to detect whether the film leader has left the spool. When the switch $S_{SLS}$ is off, the back cover switch $S_{RC}$ is checked at step #18-4. When the back cover switch $S_{RC}$ is also off (i.e., the film is still wound on the spool and the back cover is closed), the process returns to step #18-3 to continue driving the film rewinding motor. When the spool switch $S_{SLS}$ turns on, the motor is stopped at step #18-5, and the display as shown in FIG. 8I is made at step #18-6 to indicate that the film rewinding process is finished. The process waits at step #18-8 until the back cover is opened. When the back cover is opened (i.e., when the back cover switch $S_{RC}$ turns on), the process returns to step #2 of FIG. 7A. When the spool switch $S_{SLS}$ is off and the back cover switch $S_{RC}$ is on (i.e., the back cover is opened while the film is still being rewound), the rewinding operation is stopped at step #18-7, and the process returns to step #2.

Figure 8J:
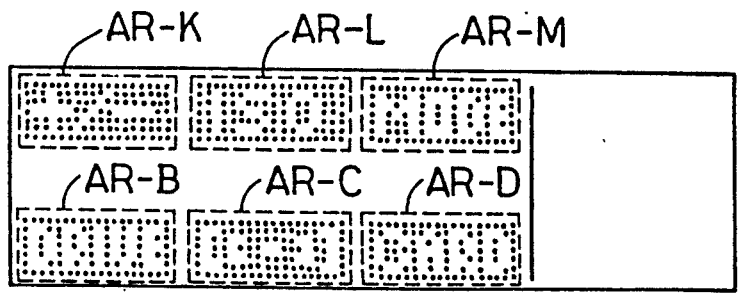

When the rewinding condition is not satisfied at step #15, the set switch $S_{SET}$ is checked at step #16. When the set switch $S_{SET}$ is on here, the five-second timer TMA is restarted at step #19, and the display as shown in FIG. 8J is made at step #20 to indicate each function of the panel switches $S_A$-$S_F$. That is, the dot matrix part 16 is divided into six areas AR-K, AR-L, AR-M, AR-B, AR-C and AR-D, respectively corresponding to the six panel switches $S_A$, $S_B$, $S_C$, $S_D$, $S_E$ and $S_F$, and the functions of the switches at this time is indicated in the areas.

Then every panel switch $S_A$-$S_F$ is checked at steps #21 through #26. When an operation on one of them is sensed, the corresponding process (step #36, #32, #37, #33, #38, #34 or #35) is executed.

When all the six switches are off, the photomeasurement switch $S_1$ is checked at step #27. When the switch $S_1$ is on, the process returns to step #2, otherwise the main switch $S_M$ is checked at step #28. When the main switch $S_M$ is off, the process returns to step #2, and otherwise the five-second timer TMA is checked at step #29. When the timer TMA is counting (i.e., five seconds have not yet elapsed since it was started at step #19), the process returns to step #21, and otherwise (i.e., five seconds have passed) the process returns to step #2. The above-mentioned process at steps #27 et seq. are described as follows. After the set switch $S_{SET}$ is turned on, the panel switch checking process (steps #21-#26) is repeated for five seconds. While the panel switches $S_A$-$S_F$ are checked through, the main switch $S_M$ and the photomeasurement switch $S_1$ are also checked: when the main switch $S_M$ is turned off, or the photomeasurement switch $S_1$ is turned on, the process returns to step #2.

Here the respective display process of steps #36, #32, #37, #33, #38, #34 and #35 are described.

Film speed setting

Figure 8K:
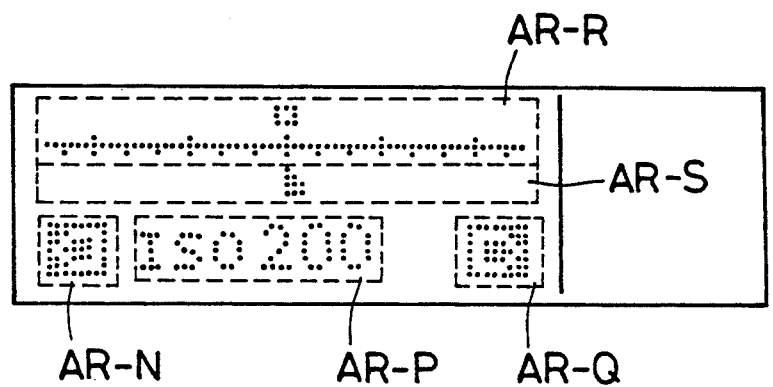
Figure 12:
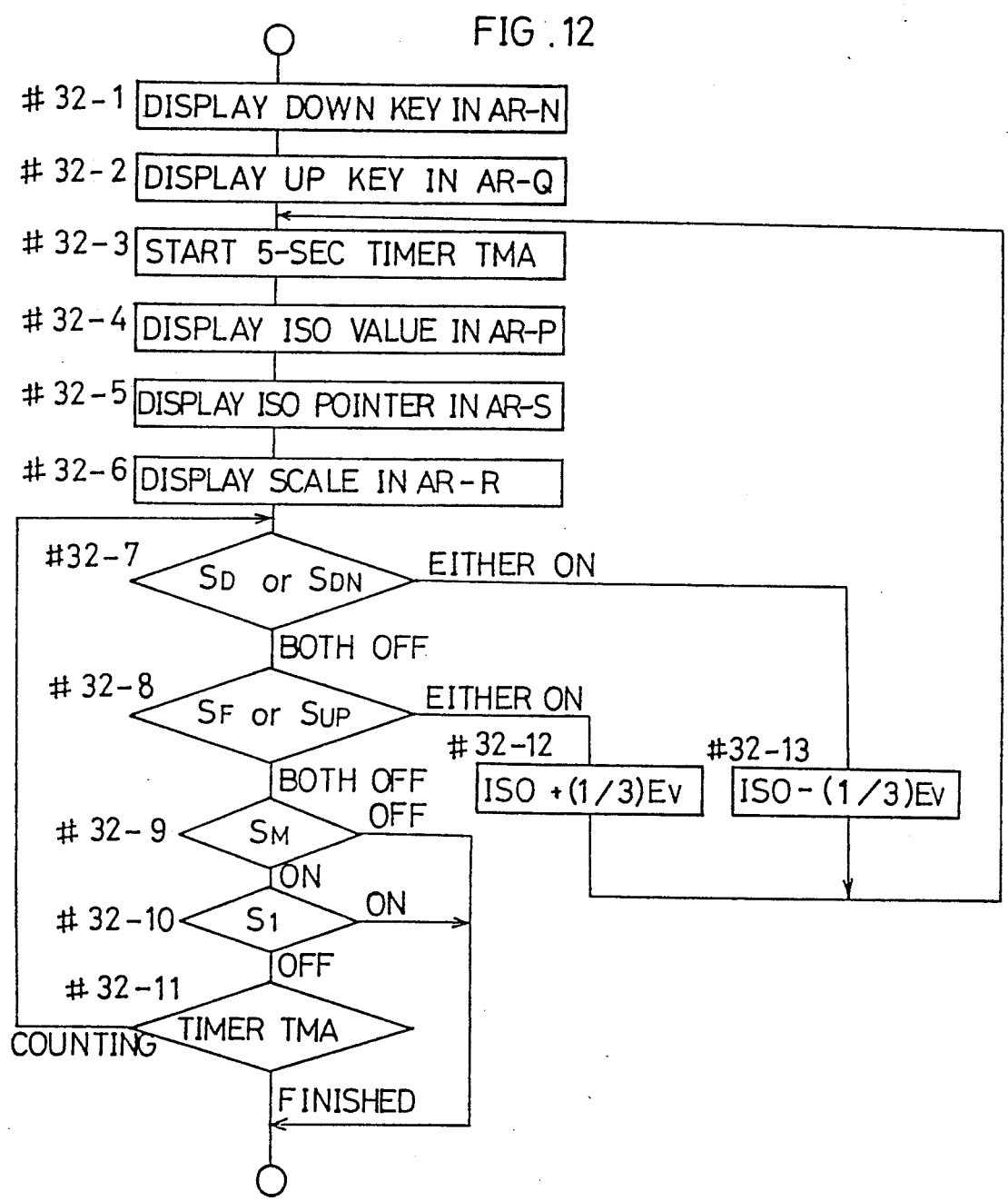
FIG. 12 is a flowchart for displaying the film speed setting process.

When the panel switch $S_B$ is pressed, the process proceeds to step #32 for setting the film speed (in ISO), which is detailed by the flowchart of FIG. 12 and the display example of FIG. 8K. First at step #32-1, a down switch mark is displayed in the lower left area AR-N of the dot matrix part 16, then an up switch mark is displayed in the lower right area AR-Q. When the corresponding panel switch $S_D$ or $S_F$ is pressed, the down or up switch $S_{DN}$, $S_{UP}$ turns on and the film speed is manually changed. The film speed can also be changed by operating the slide switch 19 on the camera body 15 (up switch $S_{UP}$ turns on when slid to the right and down switch $S_{DN}$ turns on when slid to the left). Then the five second timer TMA is started at step #32-3, and the currently-set film speed is displayed in the lower center area AR-P. Further at subsequent step #32-5, an index pointer mark is shown in the central row area AR-S, and a linear scale is displayed in the top row area AR-R. The linear scale is for indicating the film speed value: the square mark at the center of the scale indicates the DX film speed automatically read from the film cartridge. The index mark in the area AR-S indicates the currently-set film speed. When the set film speed is the same as the DX film speed, the index mark is placed at the center, under the square mark. When the film speed is manually increased from the DX value, the index mark is displaced to the right. The larger graduations on the scale are placed at every 1 Ev step, and the smaller graduations are at ever $(\frac{1}{3})$Ev step. For example, when the film speed is manually set to 200 in ISO scale while the DX value is 100, the index mark is placed 1 Ev to the right of the central square mark. That is, the distance between the central square mark above and the index mark below the linear scale show the difference between the automatic and manual settings of the film speed, and when the index mark is to the right of the central square mark, the difference is positive, and vice versa. When the manual film speed value is further increased after the index mark stops at the rightmost $(2+\frac{1}{3})$Ev point, the linear scale with the central square mark in the area AR-R moves to the left. For example, when the film speed is manually set to 1600 ISO for the DX value of 100, the display appears as shown in FIG. 8M. Various other display method can be used to indicate large differences between the automatic and manual values. One is to make the index mark blink when the difference exceeds the rightmost (or leftmost) value. Another is to change the shape of the index mark. These methods have an advantage that they simplify the display program.

Figure 9A:
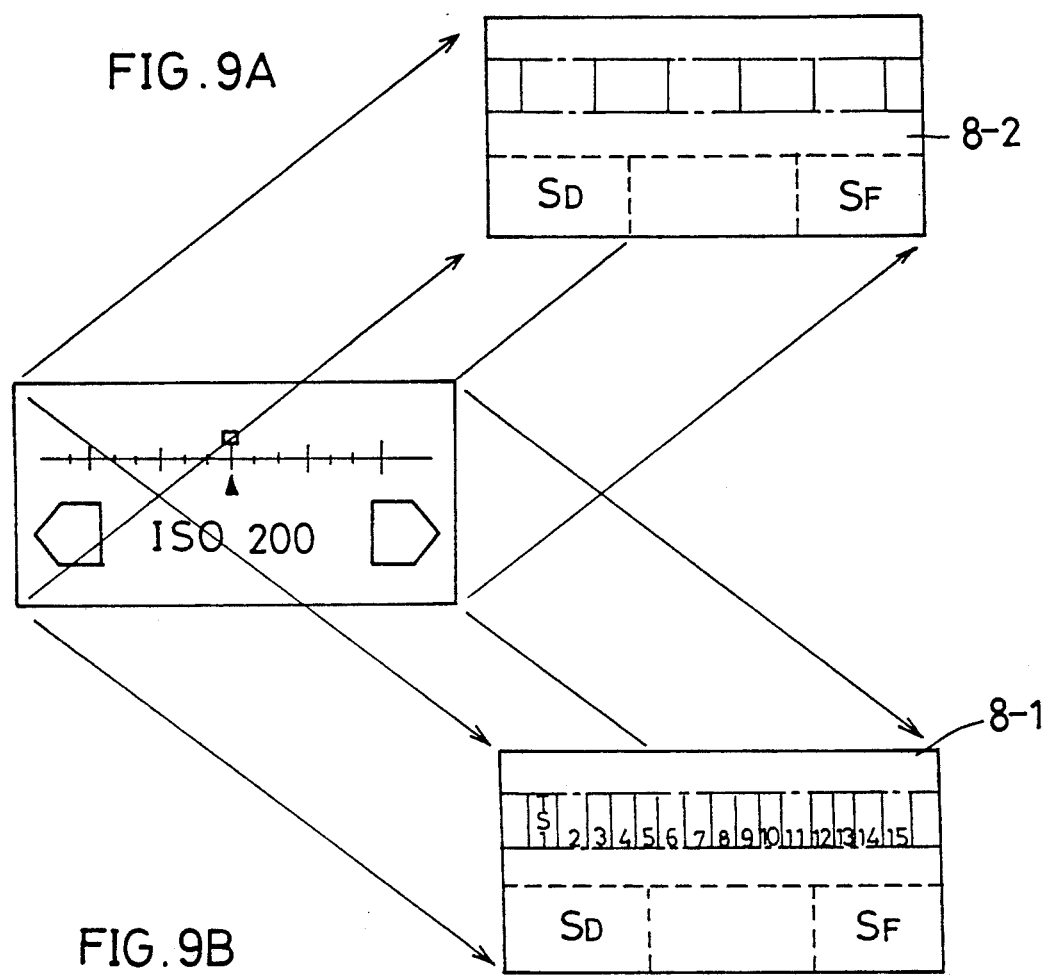
FIGS. 9A and 9B are two variations of the panel switch construction.
Figure 9B:
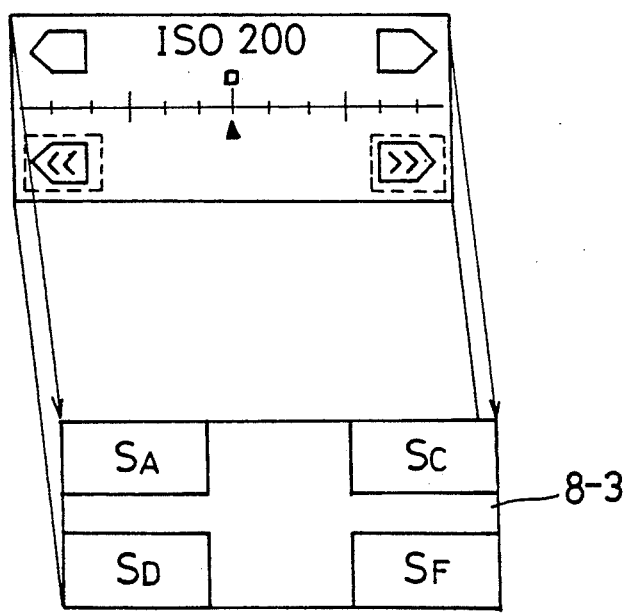

A method for facilitating the manual film speed setting is introduced here. As shown in FIG. 9A, the upper part of the transparent panel switch 8-1 (corresponding to the linear scale display area AR-R) is finely divided into small parts TS1-TS15, and the film speed is directly set by pressing one of the small panel switches TS1-TS15. For example, when the photographer presses on the leftmost larger graduation of the linear scale, the panel switch TS2 turns on and the film speed is directly changed to 50 ISO from the automatically-set DX value of 200. FIG. 9A shows another similar example at the top. The panel switch 8-2 is divided larger than that shown below (8-1): in the example 8-2, the interval between switches is 1 Ev. The minute adjustment in $(\frac{1}{3})$Ev intervals are made by pressing the up switch $S_F$ or down switch $S_D$. FIG. 9B shows still another example of manual film speed setting. In this example, four panel switches $S_A$, $S_C$, $S_D$ and $S_F$ are used: rough setting by 1 Ev steps is made by pressing the lower switches $S_D$ and $S_F$, and fine setting by $(\frac{1}{3})$Ev steps is made by pressing the upper switches $S_A$ and $S_C$ (or using the slide switch 19). The "<<" and ">>" marks in the areas AR-N and AR-Q under the panel switches $S_D$ and $S_F$ show the rough setting function of the switches.

Returning to FIG. 12, the down switch $S_{DN}$ (i.e., the panel switch $S_D$ or the left slide of the slide switch 19) is checked at step #32-7. When the down switch is on (i.e., either panel switch $S_D$ is pressed or the slide switch 19 is slid to the left), the film speed value is decreased by $(\frac{1}{3})$Ev at step #32-13, returning to step #32-3. When neither down switch is operated, the up switch $S_{UP}$ is checked at step #32-8. When either panel switch $S_F$ is pressed or the slide switch 19 is slid to the right, the film speed is increased by $(\frac{1}{3})$Ev at step #32-12. When neither down switch nor up switch is operated, the main switch $S_M$ is checked at step #32-9 and the photomeasurement switch $S_1$ is checked at step #32-10, followed by checking of the five second timer TMA at step #32-11. The timer TMA has been started when the process entered this film speed setting routine (i.e., when the panel switch $S_B$ is pressed at step #22 of FIG. 7B). The process of the steps #32-9 to #32-11 is the same as that by the steps #27 to #29 described before.

Film winding mode setting

Figure 13:
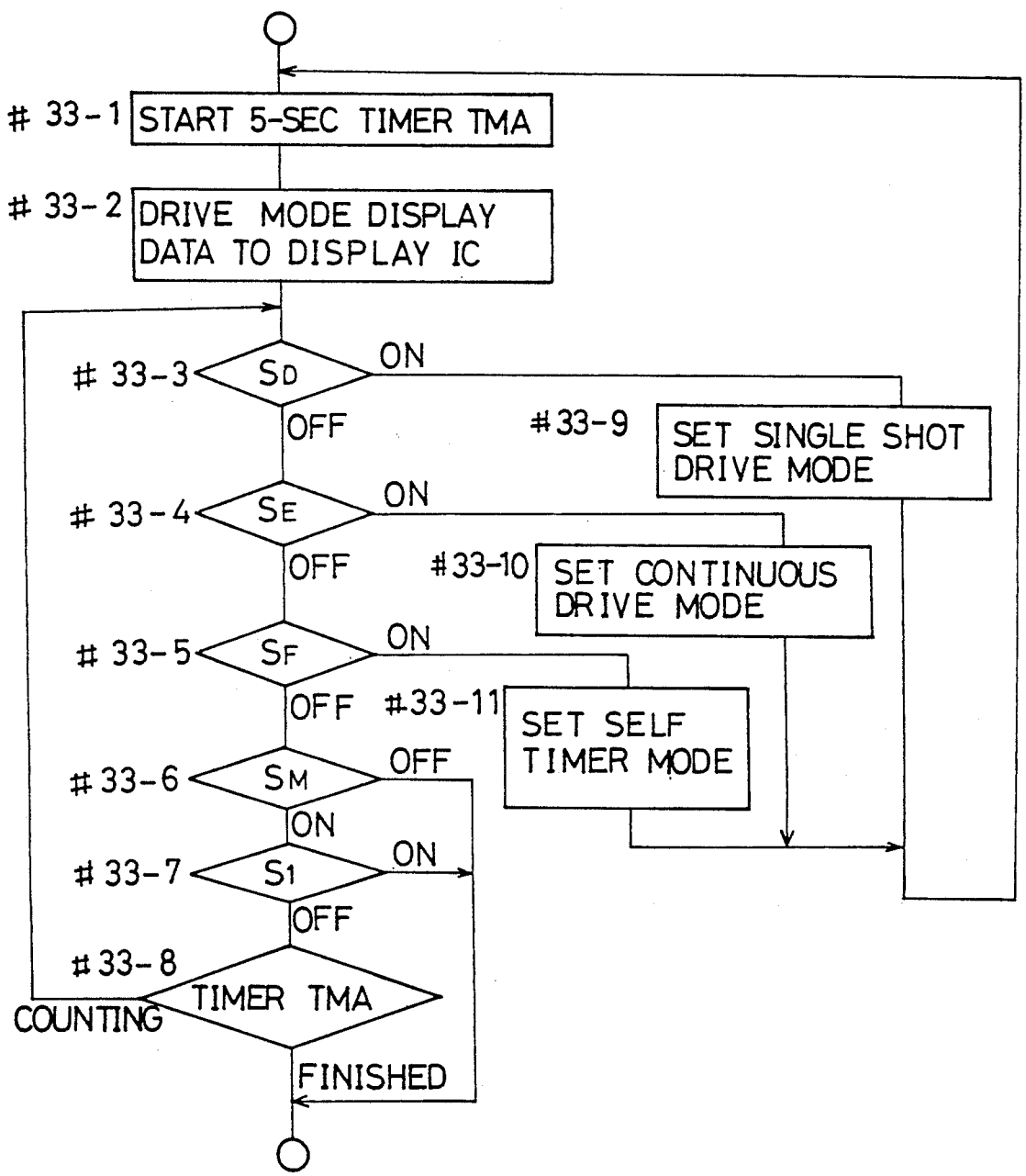
FIG. 13 is a flowchart for displaying the frame advancing mode setting process.

When the panel switch $S_D$ is pressed while the dot matrix part 16 is as shown in FIG. 8J, the process proceeds to step #33 for setting the frame advancing mode, which is detailed by the flowchart of FIG. 13. First the five second timer TMA is started at step #33-1, and then the display as shown in FIG. 8N is made at step #33-2. In the lower left area AR-B is displayed a mark representing the single frame advancing mode, in the lower center area AR-C is displayed a mark representing the continuous advancing mode, and in the lower right area AR-C is displayed a clock mark representing the self-timer mode. An index mark is displayed above one of the these three modes to indicate the current mode setting (single frame advancing mode in FIG. 8N). Then the panel switches $S_D$, $S_E$ and $S_F$ corresponding to these areas AR-B, AR-C and AR-D are checked at steps #33-3, #33-4 and #33-5. When one of the switches is pressed, the mode corresponding to the switch is selected and the index mark is moved to above the selected area (step #33-9, #33-10 or #33-11). When no switch is pressed, steps #33-6 through #33-8 are executed similarly to the steps #27 through #29 of FIG. 7B.

Exposure override setting

Figure 14:
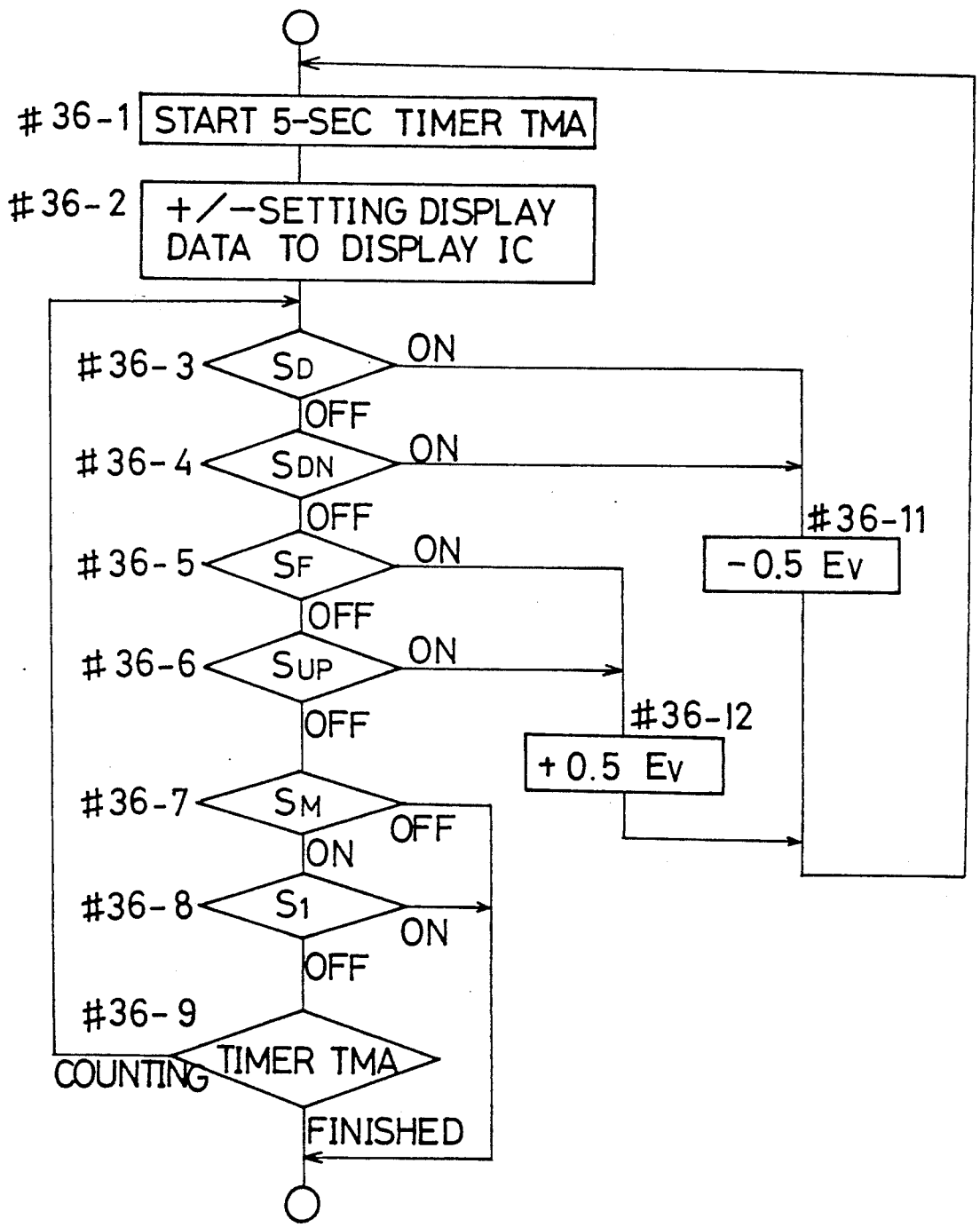
FIG. 14 is a flowchart for displaying the exposure override setting process.

When the panel switch $S_A$ is pressed while the dot matrix part 16 is as shown in FIG. 8J, the process proceeds to step #36 for setting the exposure override, which is detailed by the flowchart of FIG. 14. First the five second timer TMA is started at step #34-1, and then the display as shown in FIG. 8O is made at step #34-2. The manner of display in the dot matrix part 16 is the same as in the case of the film speed setting (FIGS. 8K-8M), except that the lower center area AR-P shows the exposure override value ("−2.0 Ev" in FIG. 8O). The linear scale in the area AR-R spans $+/-4.0$ Ev, and thus the small graduations on the scale indicate $(\frac{1}{3})$Ev steps. When no exposure override is set, the index mark in the area AR-S is placed below the central square mark. By pressing the panel switch $S_D$ or $S_F$ (or sliding the slide switch 19 to the left or right), the exposure override value is decreased or increased by (½)Ev steps (steps #36-3 through #36-11). This process is similar to that from steps #32-7 to #32-13.

Exposure control mode setting

Figure 15:
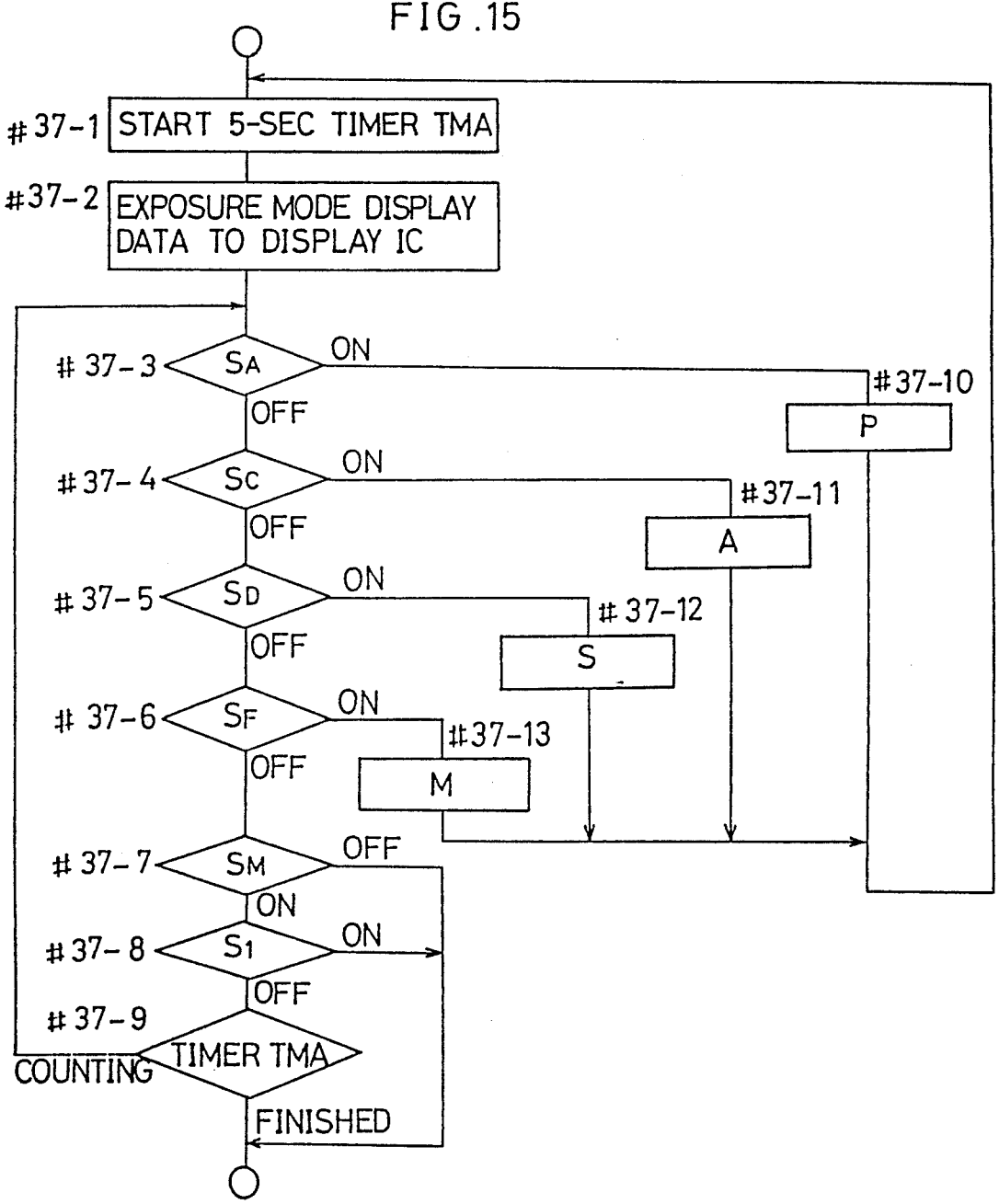
FIG. 15 is a flowchart for displaying the exposure control mode setting process.

When the panel switch $S_C$ is pressed while the dot matrix part 16 is as shown in FIG. 8J, the process proceeds to step #37 for setting the exposure control mode, which is detailed by the flowchart of FIG. 15. First the five second timer TMA is started at step #37-1, and then the display as shown in FIG. 8P is made at step #37-2. In this case, four areas AR-K, AR-M, AR-B and AR-D at the four corners of the dot matrix part 16 are used to indicate the four modes: "P" for the program controlled automatic exposure mode; "A" for the aperture priority automatic exposure control mode; "S" for the shutter speed priority automatic exposure control mode; and "M" for the manual exposure control mode. At the inner side of each of the four areas AR-K, AR-M, AR-B and AR-D is provided an area AR-O for displaying an index mark for pointing the currently effective exposure control mode. In the central area AR-Z is displayed a sign "MODE" to indicate that the exposure control mode setting is under way.

After the display process at step #37-2 of FIG. 15, the panel switches $S_A$, SC, $S_D$ and $S_F$ corresponding to the areas AR-K, AR-M, AR-B and AR-D are checked at steps #37-3 through #37-6. When one of the switches $S_A$, $S_C$, $S_D$ and $S_F$ is pressed, the corresponding step #37-10, #37-11, #37-12 or #37-13 is executed in which the exposure control mode is changed to the selected mode and the index mark is moved to point the selected mode. Steps #37-7, #37-8 and #37-9 are the same as the steps #27, #28 and #29. Currently effective mode can be indicated in other ways in the dot matrix part 16. FIG. 8Q shows a method showing the current mode by blinking the mode display, FIG. 8R shows a method where the current mode display is reversed, and FIG. 8S shows a method in which the current mode symbol is displayed also at the center.

AF zone setting

Figure 16:
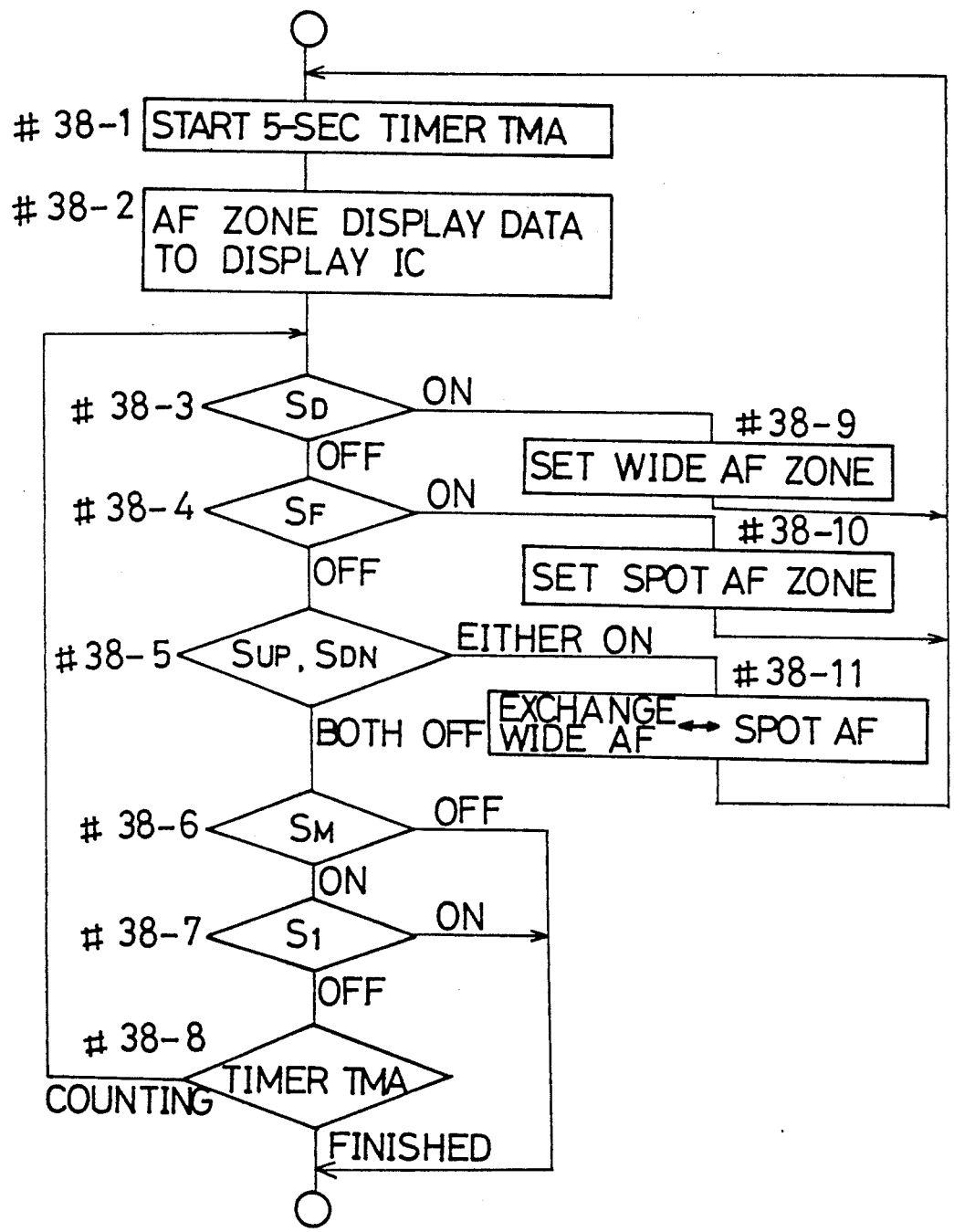
FIG. 16 is a flowchart for displaying the AF zone setting process.

When the panel switch $S_E$ is pressed while the dot matrix part 16 is as shown in FIG. 8J, the process proceeds to step #38 for setting the AF zone setting, which is detailed by the flowchart of FIG. 16. First the five second timer TMA is started at step #38-1, and then the display as shown in FIG. 8T is made at step #38-2. In this case, the sign "AF" is displayed in the upper center area AR-T to indicate that the AF zone setting is under way, and two symbols representing the wide AF zone mode and the spot AF zone mode are displayed in the two lower corner areas AR-B and AR-D. Currently effective AF zone mode is pointed by an index mark in the area AR-AA provided above each of the areas AR-B and AR-D. After the display process at step #38-2, the panel switches $S_D$ and $S_F$ corresponding to the areas AR-B and AR-D are checked at steps #38-3 and #38-4. When either switch is pressed, the AF zone mode is changed to the selected one and the index mark moves to above the selected mode area at step #38-9 or #38-10. When neither panel switch is pressed, the up switch and the down switch (slide switch 19) are then checked at step #38-5. When the slide switch 19 is slid to either direction, the two AF zone modes (wide and spot) change alternately. When no switch is operated, steps #38-6, #38-7 and #38-8 are executed to check the main switch $S_M$ and the photomeasurement switch $S_1$ for five seconds similarly to steps #27–#29. In this case, also, the currently effective mode is indicated by blinking, reversing, etc. as described before.

Card setting

Figure 17A:
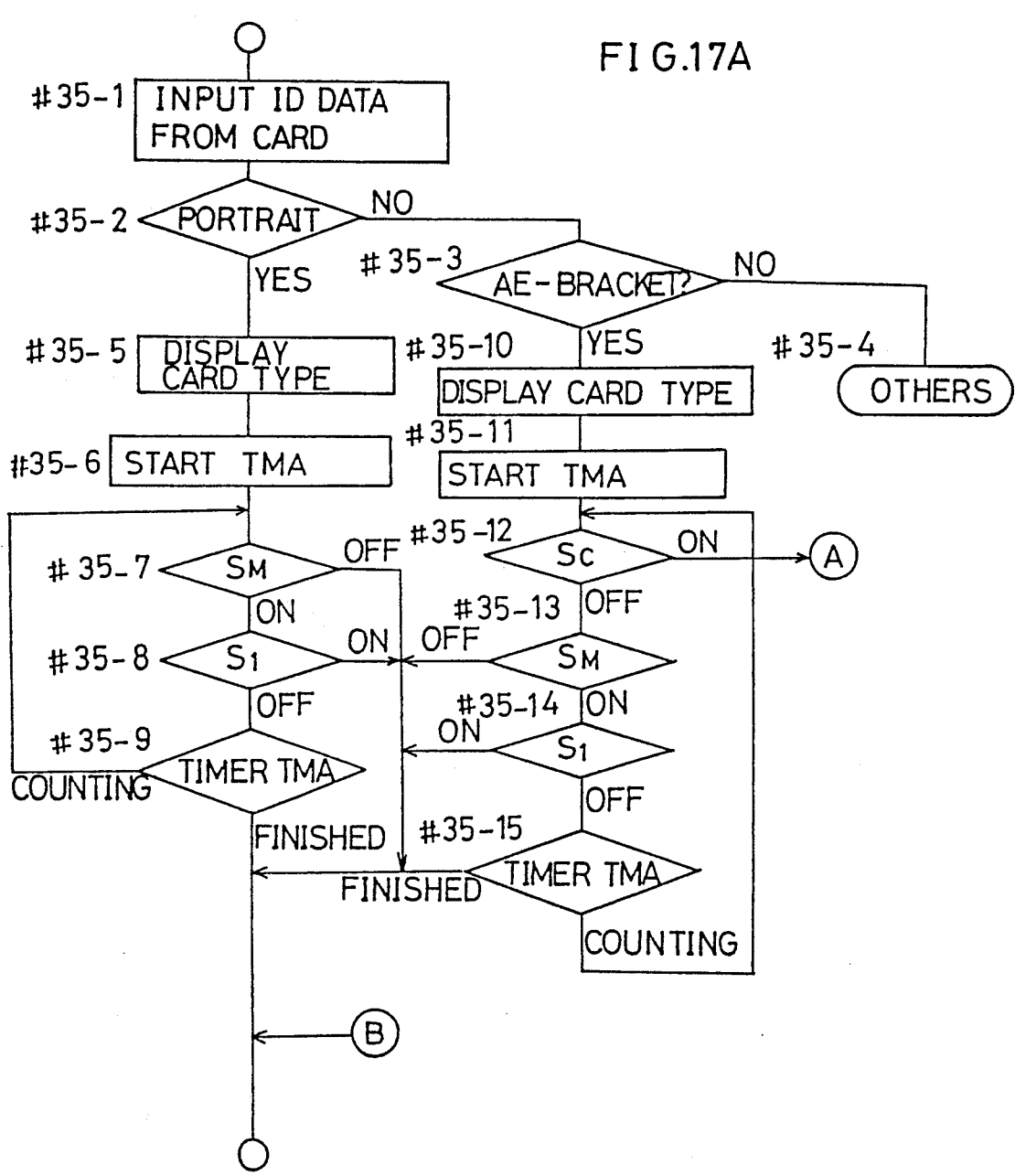
FIGS. 17A and 17B are flowcharts integrally for displaying the card setting process.
Figure 17B:
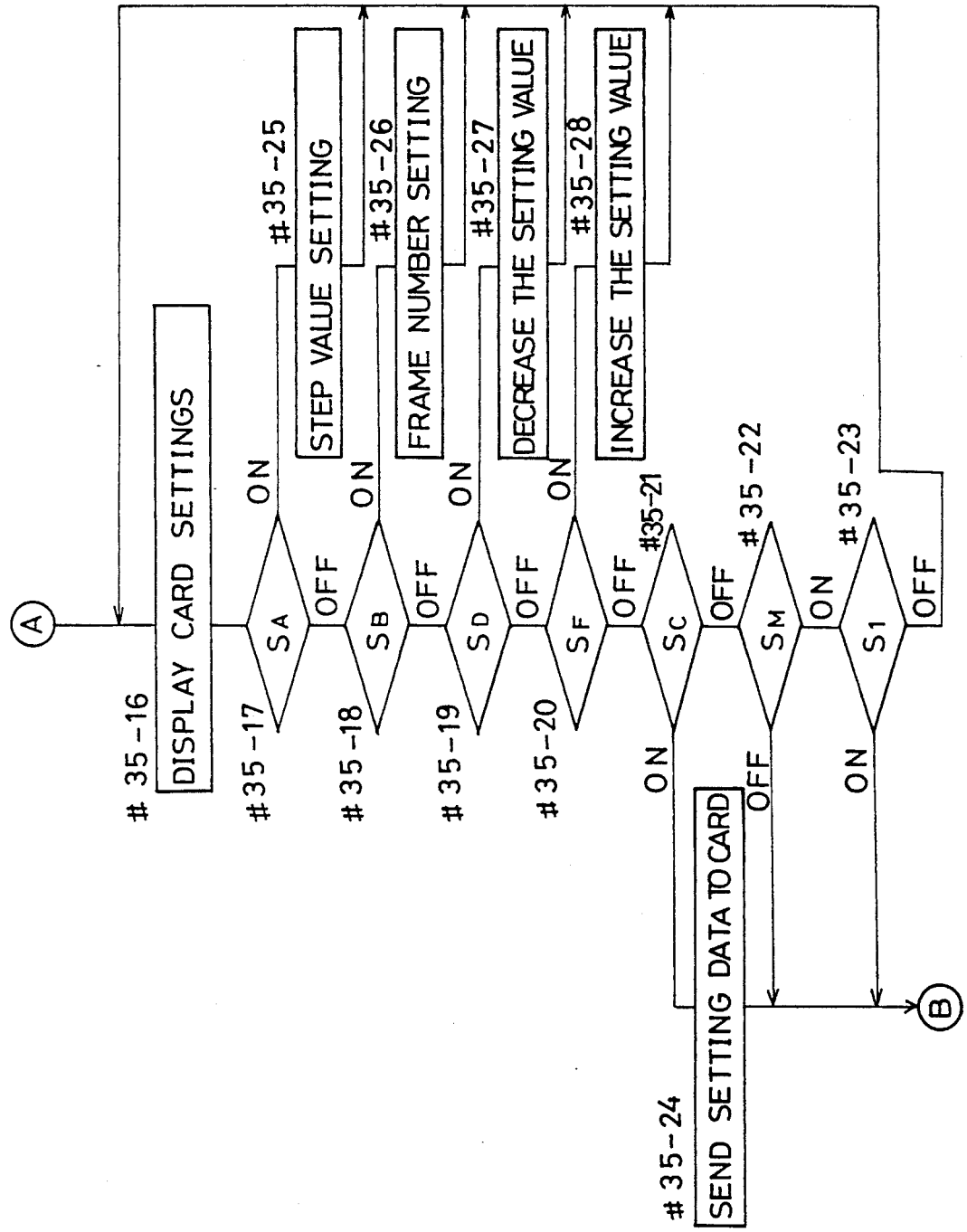
Figure 18A:
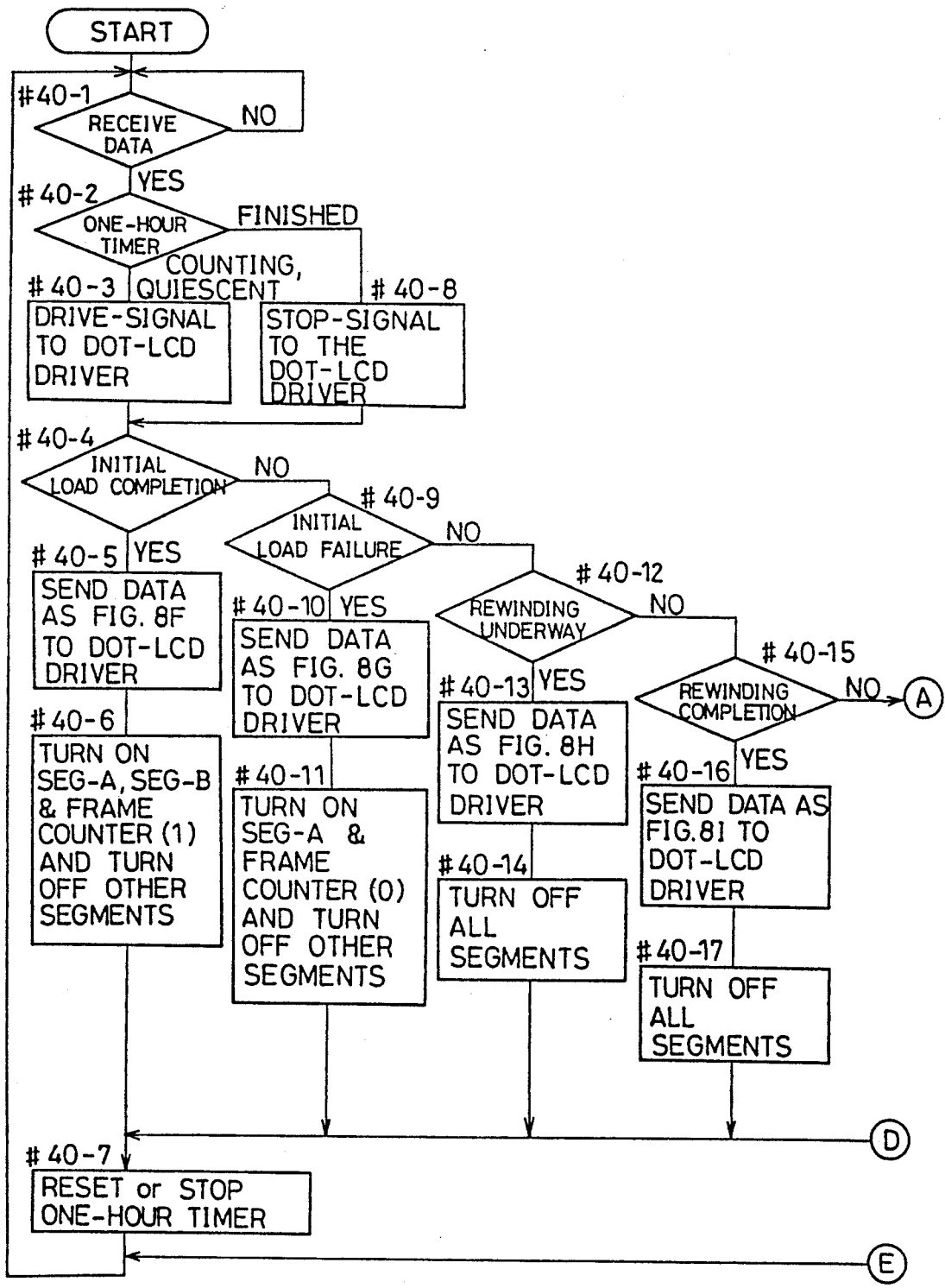
FIGS. 18A through 18D are flowcharts integrally for displaying the operation of the display IC.
Figure 18B:
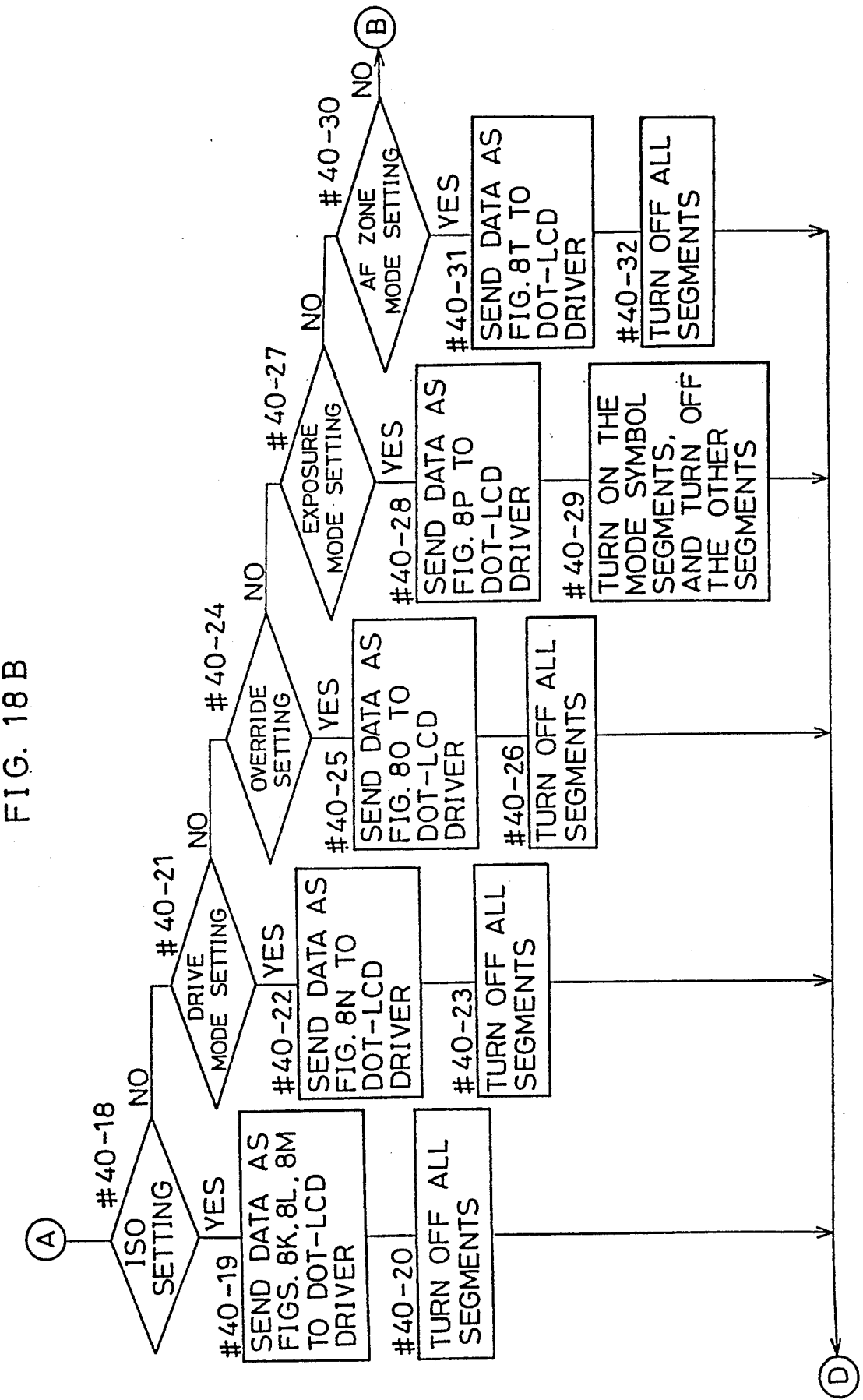
Figure 18C:
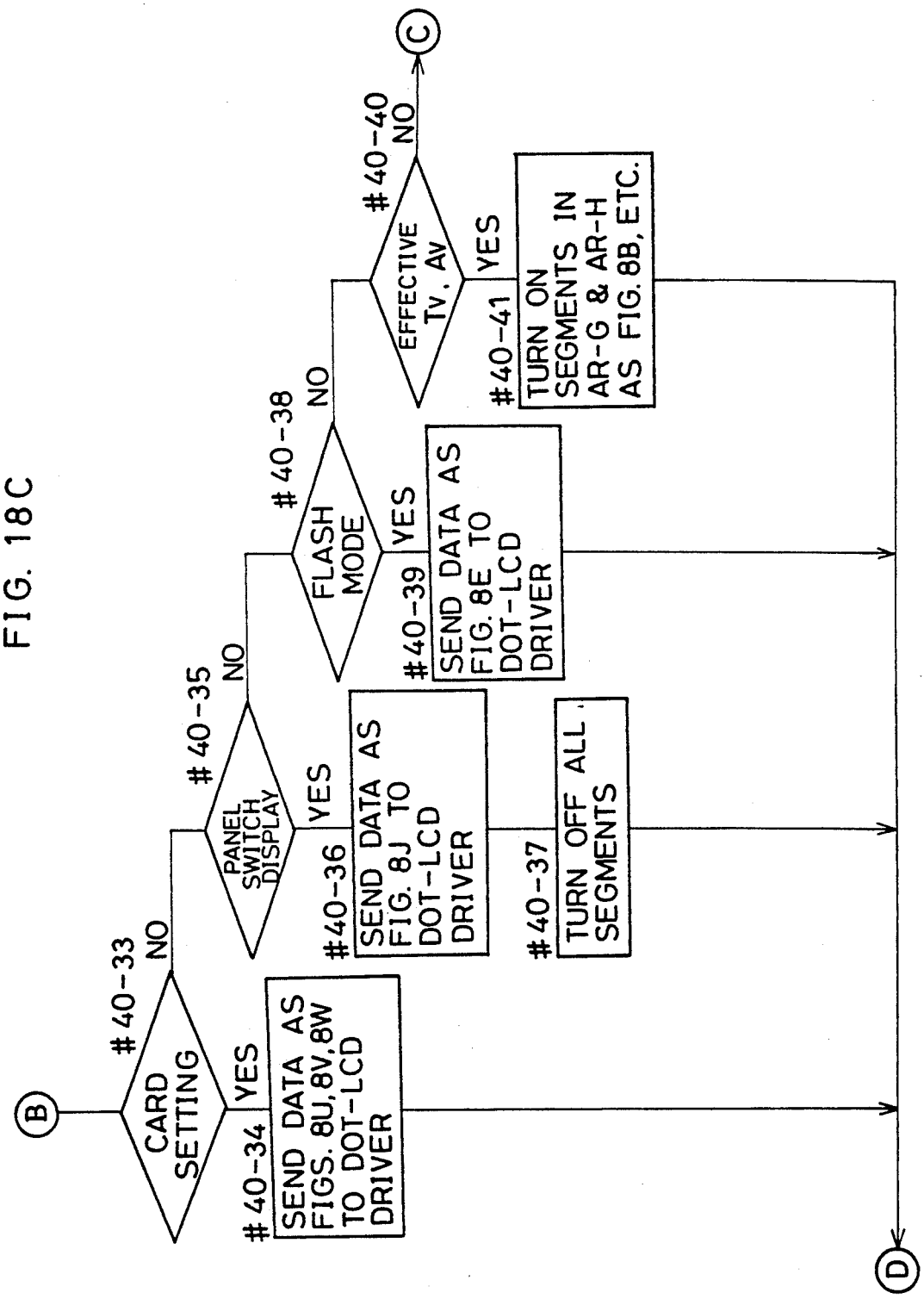
Figure 18D:
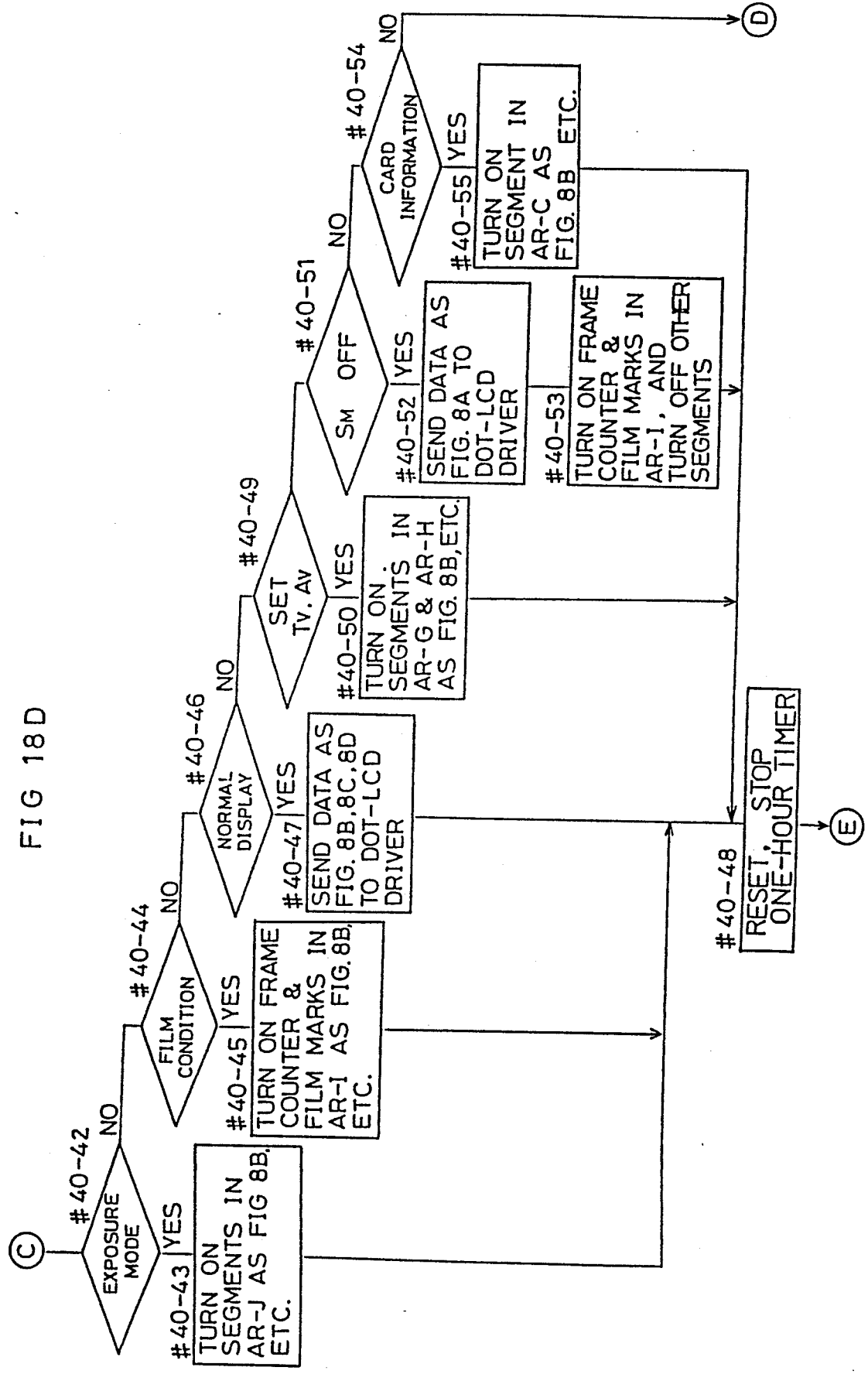

When the panel switch $S_F$ is pressed while the dot matrix part 16 is as shown in FIG. 8J, the process proceeds from step #26 to step #34 where it is determined whether a card is attached to the camera body. Whether a card is attached to the camera body is already known in the data communication process at step #5, and the state is recorded by a flag. When a card is attached, an appropriate display is made at step #35, and otherwise the process returns to step #27. The display process at step #35 is detailed by the flowcharts of FIGS. 17A and 17B.

First a data communication is made at step #35-1 to receive various card data from the attached card. The card data include data of the card type and data of the card setting. The card type is determined at steps #35-2, #35-3 and #35-4 (which includes other determination steps but is not detailed). Description is made here for a portrait card and an AE bracket card alone, and that for the other types of cards (which will be determined at step #35-4) are not made here.

A portrait card is designed so that, when attached to a camera, it controls various camera functions most suitably for taking a portrait picture, whereby the background is properly obscured. An automatic exposure bracket card (AE bracket card), when attached to a camera, is designed to automatically take a series of pictures with the exposure values varying progressively with a preset step. The number of pictures (frames) and the exposure step value can be preset. Further details of these portrait card and bracket card are described in the Japanese Published Unexamined Patent Application No. S63-131289.

Figure 8L:
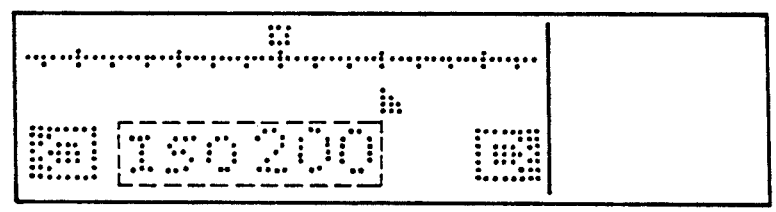
Figure 8M:
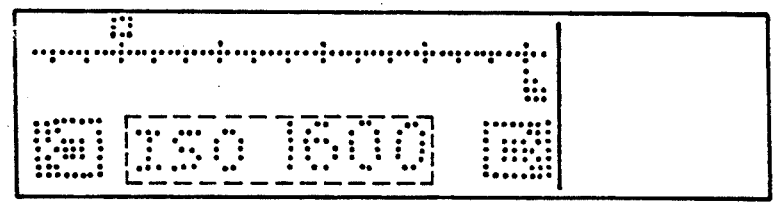
Figure 8N:
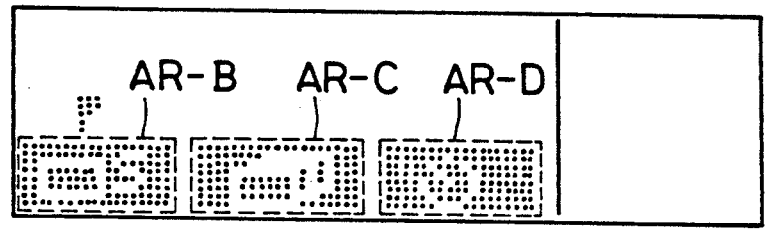
Figure 8O:
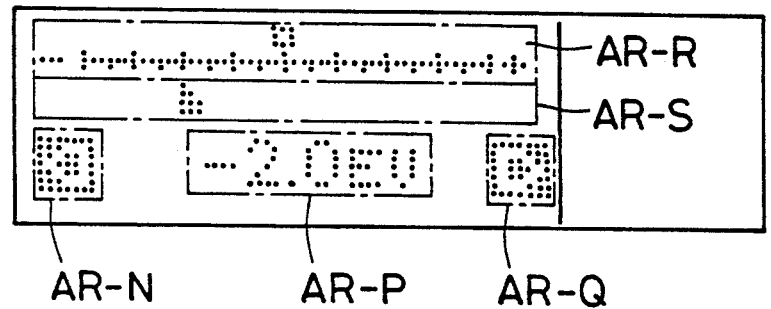
Figure 8P:
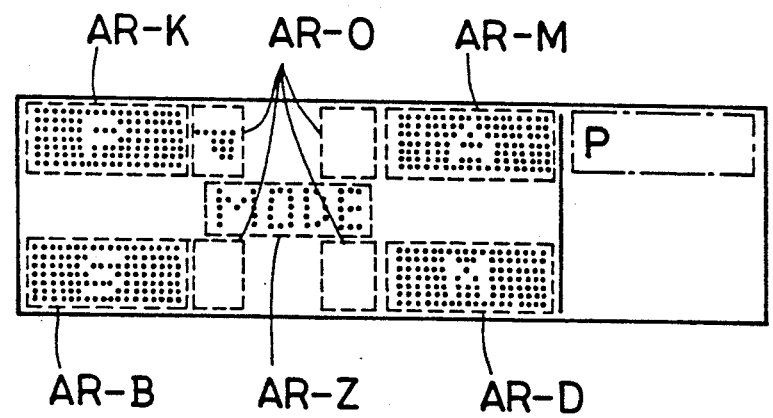
Figure 8Q:
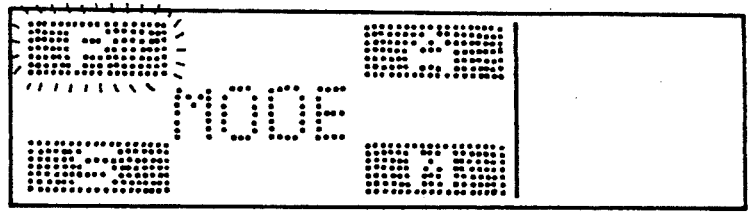
Figure 8R:
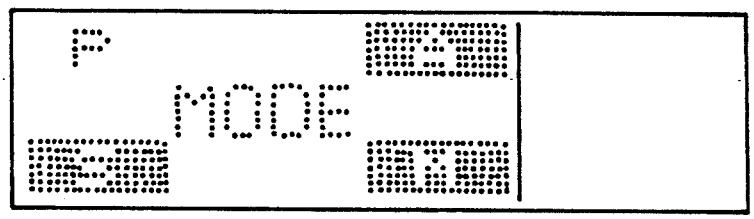
Figure 8S:
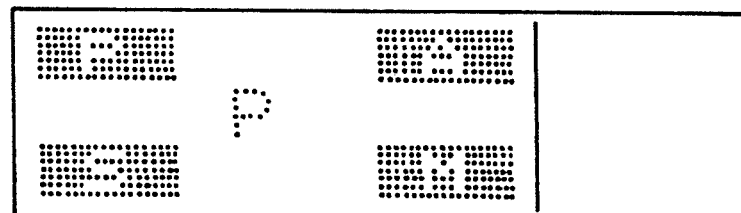
Figure 8T:
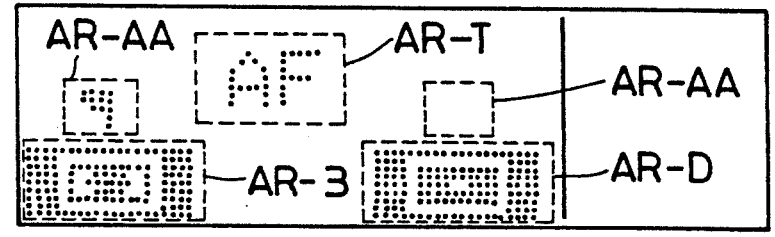
Figure 8U:
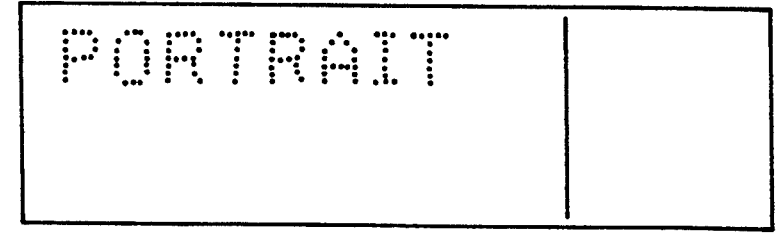

When the attached card is determined to be a portrait card at step #35-2, the card type "PORTRAIT" is displayed in the dot matrix part 16 as shown in FIG. 8U at step #35-5. Then the five second timer TMA is started at step #35-6 and the display continues for five seconds, while steps #35-7, #35-8 and #35-9 are executed similarly to the steps #27–#29 of FIG. 7B to check the main switch $S_M$ and the photomeasurement switch $S_1$.

Figure 8V:
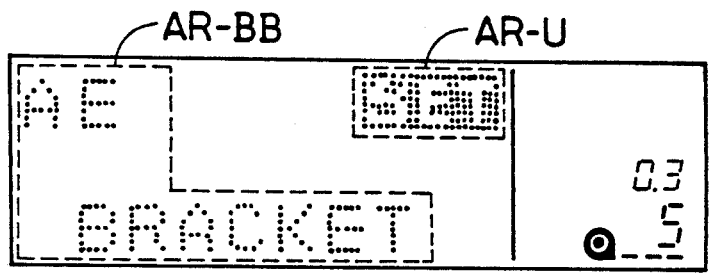

When the attached card is determined not a portrait card at step #35-2, then it is determined at step #35-3 whether it is an AE bracket card. When it is an AE bracket card, the display as shown in FIG. 8V is made at step #35-10. In the L-shaped area AR-BB is shown the card type "AE BRACKET", and in the upper right area AR-U is shown a reversed sign "SET" to show the place of the panel switch for starting the card setting. When the panel switch $S_C$ corresponding to the area AR-U is pressed, the above-mentioned setting values (the number of pictures to be taken and the exposure step value) of the automatic exposure bracket photographing can be inputted. During the card setting operation, the number of pictures "5" is shown in the bottom area AR-I of the segment part 17, and the exposure step value "0.3" (Ev) is shown in the penultimate area AR-H.

Figure 8W:
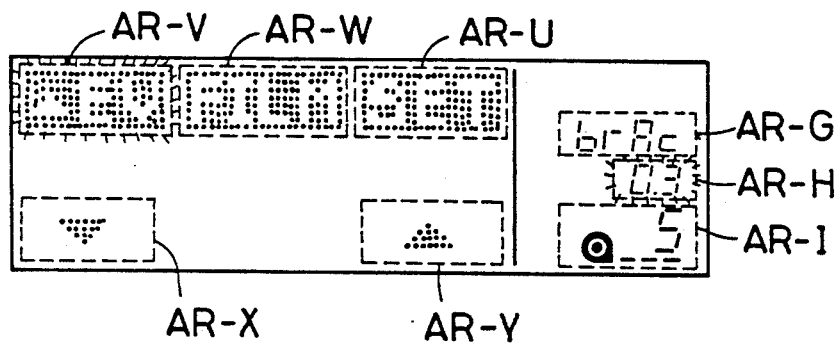

Then the panel switch $S_C$ is checked at step #35-12. When the switch $S_C$ is not pressed here, steps #35-13,

35-14 and #35-15 are executed to wait five seconds. When the panel switch $S_C$ is pressed within five seconds since the display of FIG. 8V is started, the card setting is changed at step #35-16 et seq. At step #35-16, the dot matrix display is made as shown in FIG. 8W to show the setting parameters and the place of the corresponding panel switch. At the upper left area AR-V (corresponding to the panel switch $S_A$) is shown "ΔEV" for the exposure value step; at the upper center area AR-W is shown "FILM" for the number of pictures to be automatically taken; and at the left and right lower areas AR-X and AR-Y are shown a down switch mark "▼" and an up switch mark "▲". Since the "AE BRACKET" sign cannot be accommodated in the dot matrix part 16, a similar sign "brAc" is constructed in the area AR-G of the segment part 17 instead to show that an AE bracket card is attached. The areas AR-H and AR-I of the segment part 17 continues the display from the state of FIG. 8V.

After making the display of FIG. 8W, the panel switches $S_A$, $S_B$, $S_C$, $S_D$ and $S_F$ are checked at steps #35-17 through #35-20, and, when one of the switches is pressed, the corresponding step #35-24, #35-25, #35-26, #35-27 or #35-28 is executed. When the switch $S_A$ is pressed, the displays in the area AR-V and in the area AR-H blink, as shown in FIG. 8W, to show that the exposure step value can be changed. Then the process returns to step #35-16 to wait for an operation on the down switch $S_D$ or on the up switch $S_F$. When either switch is pressed at step #35-19 or #35-20, the exposure step value is decreased or increased, and the display in the area AR-H is accordingly changed (step #35-27 or #35-28). When the panel switch $S_B$ is pressed, the number of pictures is similarly changed. In this embodiment, the exposure step value changes stepwise as 0.7→0.5→0.3 (Ev) with every depression of the down switch $S_D$, and the number of pictures changes as 7→5→3. The up switch $S_F$ changes the values reversely.

The sign "SET" is continued from step #35-10 (FIG. 8V) to step #35-16 (FIG. 8W). When the panel switch $S_C$ corresponding to the sign "SET" is pressed at step #35-21 (FIG. 8W), the set values (exposure step value and the number of pictures) are sent to the attached card (AE bracket card) at step #35-24, and the card setting process ends. When no panel switch is pressed during steps #35-16 through #35-21, the main switch $S_M$ and the photomeasurement switch $S_1$ are checked at steps #35-22 and #35-23. In this case, when the main switch $S_M$ is on and the photomeasurement switch $S_1$ is off, the process returns to step #35-16 to wait for any panel switch operation. This time, the five second timer does not work, and the steps #35-16 through #35-23 are repeated until the "SET" switch $S_C$ is pressed (step #35-21), the main switch $S_M$ is turned off (step #35-22) or the photomeasurement switch $S_1$ is turned on (step #35-23).

Returning to FIG. 7B, when the set switch $S_{SET}$ is off at step #16, the five second timer TMA that has been started in the initial loading process of step #17 (precisely, step #17-4 of FIG. 10) is checked at step #39. When the timer TMA is still counting, the process returns to step #2. This means that the display as shown in FIG. 8F continues for five seconds after the film is successfully loaded if neither the rewind switch $S_{REW}$ nor the set switch $S_{SET}$ is operated.

Figure 8X:
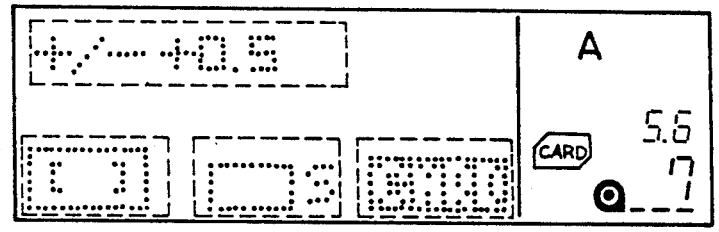

When five seconds have passed since the initial film loading, various currently effective modes or setting values are displayed in the dot matrix part 16 at step #40 (as shown in FIGS. 8B, 8C or 8D), and the currently-set shutter speed and aperture value are displayed in the areas AR-G and AR-H of the segment part 17. The set shutter speed is displayed in the S (shutter speed priority automatic exposure control) mode and in the M (manual exposure control) mode, and the set aperture value is displayed in the A (aperture value priority automatic exposure control) mode and in the M mode. Then the process proceeds to step #11 where the current exposure control mode is displayed in the area AR-J, to step #12 where film related displays are made in the area AR-I and to step #13 where the "CARD" sign of the SEG-C is displayed in the segment part 17. An example of the display here is shown in FIG. 8X. After these display steps, the process returns to step #2.

Operations of the display IC

When the display IC 2 receives display data from the controller 1, the display IC 2 constructs various displays corresponding to the data on the dot matrix part 16 and on the segment part 17 as already shown by FIGS. 8A through 8X. The operation of the display IC 2 is detailed here with reference to the flowchart dividedly shown in FIGS. 18A through 18D.

Figure 8Y:
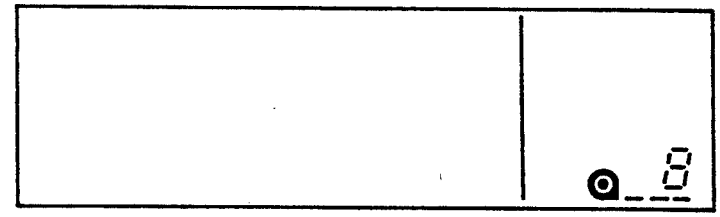
Figure 8Z:
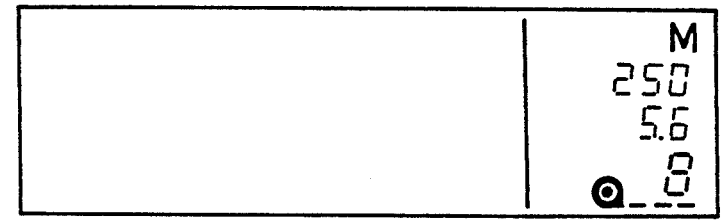

In this routine first the display IC 2 waits for any display data from the controller 1 at step #40-1. When any data is received, the process proceeds to step #40-2 where a one-hour timer is checked. The one-hour timer is started in step #40-48 (later described), and is used to count a display duration time (one hour in this embodiment) after which the display on the dot matrix part 16 of the LCD panel 7 is stopped to save the battery energy if no operation of the camera switches is made. Therefore, when the one-hour counter is determined to have finished counting, a stop command is sent to the external LCD driver IC 3 to stop display of the dot matrix part 16. For example, when the display duration time (one hour) elapses, the display of FIG. 8A changes to the display of FIG. 8Y in which only the film marks (SEG-A and SEG-B) and the frame counter "8" of the segment part 17 remain while the display in the dot matrix part 16 completely ceases. Since the segment LCD 17 consumes less energy, the display stop in the dot matrix part 16 saves the battery energy a lot. When the display duration time elapses in the M (manual exposure control) mode, the display becomes as shown in FIG. 8Z in which the mode sign "M", shutter speed value "250" and the aperture value "5.6" continue as well as the film marks and the frame counter in the segment part 17. Since these data are necessary at any time for the photographer, they are displayed full time without requiring any switch operation. When the photographer promptly wants to take a picture, the full time display helps. In the other modes, the full time display includes: mode sign, film marks and frame counter in the P (program controlled automatic exposure) mode; aperture value, mode sign, film marks and frame counter in the A (aperture priority automatic exposure control) mode; and shutter speed, mode sign, film marks and frame counter in the S (shutter speed priority automatic exposure control) mode. It is possible of course to display only the film marks and the frame counter in the A, S and M modes, too. When the one-hour timer is still counting or the timer is not working (quiescent), a display start command and a display continue command is sent to the external LCD driver IC 3 at step #40-3.

After step #40-3 or #40-8, the process proceeds to steps #40-4 et seq. where the data received at step #40-1 from the controller 1 is identified and the dot matrix part 16 and the segment part 17 are driven to make the display according to the data. The display process is tabulated below.

Initial loading successfully completed

When the received data is determined at step #40-4 to be the display data for indicating that the initial loading operation is successfully completed (i.e., data sent at step #17 of FIG. 7A, precisely, at step #17-3 of FIG. 10), the display IC 2 sends bit data (on/off data for every dot of the dot matrix part 16) at step #40-5 to the external LCD driver IC 3 to make the display as shown in FIG. 8F. Then, the film marks SEG-A and SEG-B and the initial frame counter number "1" are displayed in the segment part 17 at step #40-6 using the internal LCD driver.

Initial loading failed

When the received data is determined at step #40-9 to be the display data for indicating that the initial loading has failed (i.e., data sent at step #17 of FIG. 7A, precisely, at step #17-5 of FIG. 10), the display IC 2 sends bit data at step #40-10 to the external LCD driver IC 3 to make the figure in the dot matrix part 16 as shown in FIG. 8G. Then, the film cartridge mark SEG-A (the film mark SEG-B is not displayed this time) and the frame counter number "0" are displayed in the segment part 17 at step #40-6 using the internal LCD driver. The film cartridge mark SEG-A and the frame counter in the segment part 17 blink to warn the user of the film loading failure.

Film rewinding under way

When the received data is determined at step #40-12 to be the display data for indicating that the film rewinding operation is under way (i.e., data sent at step #18 of FIG. 7A, precisely, at step #18-2 of FIG. 11), the display IC 2 sends bit data at step #40-13 to the external LCD driver IC 3 to make the figure in the dot matrix part 16 as shown in FIG. 8H. Then, a command is sent to the segment part 17 at step #40-14 to cease all the segments there.

Film rewinding completed

When the received data is determined at step #40-15 to be the display data for indicating that the film is completely rewound (i.e., data sent at step #18 of FIG. 7A, precisely, at step #18-6 of FIG. 11), the display IC 2 sends bit data at step #40-16 to the external LCD driver IC 3 to make the figure in the dot matrix part 16 as shown in FIG. 8I. Then, a command is sent to the segment part 17 at step #40-17 to cease all the segments there.

Film speed setting

When the received data is determined at step #40-18 to be the display data for indicating that the film speed setting operation is under way (i.e., data sent at step #32 of FIG. 7B, precisely, at one of the steps #32-1 through #32-6 of FIG. 12), the display IC 2 sends bit data at step #40-19 to the external LCD driver IC 3 to make the display in the dot matrix part 16 as shown in FIGS. 8K, 8L or 8M. Then, a command is sent to the segment part 17 at step #40-20 to cease all the segments there.

Frame advancing mode setting

When the received data is determined at step #40-21 to be the display data for indicating that the frame advancing mode setting operation is under way (i.e., data sent at step #33 of FIG. 7B, precisely, at step #33-2 of FIG. 13), the display IC 2 sends bit data at step #40-22 to the external LCD driver IC 3 to make the display in the dot matrix part 16 as shown in FIG. 8N. Then, a command is sent to the segment part 17 at step #40-23 to cease all the segments there.

Exposure override setting

When the received data is determined at step #40-24 to be the display data for indicating that the exposure override setting operation is under way (i.e., data sent at step #36 of FIG. 7B, precisely, at step #34-2 of FIG. 14), the display IC 2 sends bit data at step #40-25 to the external LCD driver IC 3 to make the display in the dot matrix part 16 as shown in FIG. 8O. Then, a command is sent to the segment part 17 at step #40-26 to cease all the segments there.

Exposure control mode setting

When the received data is determined at step #40-27 to be the display data for indicating that the exposure control mode setting operation is under way (i.e., data sent at step #37 of FIG. 7B, precisely, at step #37-2 of FIG. 15), the display IC 2 sends bit data at step #40-28 to the external LCD driver IC 3 to make the display in the dot matrix part 16 as shown in FIG. 8P. Then, the internal LCD driver is used at step #40-29 to display the symbol letter ("P" in FIG. 8P) of the current exposure control mode in the area AR-J of the segment part 17.

AF zone setting

When the received data is determined at step #40-30 to be the display data for indicating that the AF zone setting operation is under way (i.e., data sent at step #38 of FIG. 7B, precisely, at step #38-2 of FIG. 16), the display IC 2 sends bit data at step #40-31 to the external LCD driver IC 3 to make the display in the dot matrix part 16 as shown in FIG. 8T. Then, a command is sent to the segment part 17 at step #40-32 to cease all the segments there.

Card setting

When the received data is determined at step #40-33 to be the display data for indicating that the card setting operation is under way (i.e., data sent at step #35 of FIG. 7B, precisely, at one of the steps #35-5, #35-10, #35-16, etc. of FIGS. 17A and 17B), the display IC 2 uses the external LCD driver IC 3 and the internal LCD driver at step #40-34 to make the display as shown in FIGS. 8U, 8V or 8W.

Panel switch indication

When the received data is determined at step #40-35 to be the display data for indicating the functions of the panel switches sent at step #20 of FIG. 7B, the display IC 2 sends bit data at step #40-36 to the external LCD driver IC 3 to make the display in the dot matrix part 16 as shown in FIG. 8J. Then, a command is sent to the segment part 17 at step #40-37 to cease all the segments there.

Flashlight photographing

When the received data is determined at step #40-38 to be the display data for indicating the flashlight photographing mode sent at step #9 of FIG. 7A, the display IC 2 sends bit data at step #40-39 to the external LCD driver IC 3 to make the display in the dot matrix part 16 as shown in FIG. 8E.

Effective shutter speed and aperture value

When the received data is determined at step #40-40 to be the shutter speed data or the aperture value data sent at step #10 of FIG. 7A, the display IC 2 uses the internal LCD driver at step #40-41 to display the effective (i.e., used in photographing) shutter speed in the area AR-G, and the effective aperture value in the area AR-H of the segment part 17, as shown in FIGS. 8B, etc.

Exposure control mode

When the received data is determined at step #40-42 to be the exposure control mode data sent at step #11 of FIG. 7A, the display IC 2 uses the internal LCD driver at step #40-43 to display the current exposure control mode in the top area AR-J of the segment part 17 as shown in FIGS. 8B, etc.

Film condition

When the received data is determined at step #40-44 to be the display data for indicating the condition of the film in the camera body sent at step #12 of FIG. 7A, the display IC 2 uses the internal LCD driver at step #40-45 to display the film cartridge mark SEG-A or the film mark SEG-B in the bottom area AR-I of the segment part 17 as shown in FIGS. 8B, etc.

Normal dot matrix display

When the received data is determined at step #40-46 to be the normal dot matrix display data sent at step #8 of FIG. 7A or #40 of FIG. 7B, the display IC 2 sends bit data at step #40-47 to the external LCD driver IC 3 to make the display in the dot matrix part 16 as shown in FIGS. 8B, 8C, 8D, etc.

Set shutter speed and aperture value

When the received data is determined at step #40-49 to be the set shutter speed data or the set aperture value data sent at step #41 of FIG. 7B, the display IC 2 uses the internal LCD driver at step #40-50 to display the set shutter speed in the area AR-G, or the set aperture value in the area AR-H of the segment part 17, as shown in FIGS. 8B, etc. In this case, the area corresponding to the non-set value (e.g., aperture value in the shutter speed priority mode) is ceased.

Main switch off

When the received data is determined at step #40-51 to be the display data for indicating that the main switch $S_M$ is off sent at step #3 of FIG. 7A, the display IC 2 sends bit data at step #40-52 to the external LCD driver IC 3 to make the display in the dot matrix part 16 as shown in FIG. 8A. Then, the film marks SEG-A, SEG-B and the frame counter number ("8" in FIG. 8A) are displayed in the segment part 17 at step #40-53 using the internal LCD driver.

Card

When the received data is determined at step #40-54 to be the card display data sent at step #13 of FIG. 7A, the display IC 2 uses the internal LCD driver to display the segment SEG-C of the segment part 17 at step #40-55 as shown in FIG. 8C.

When the received data is determined NO at any of the preceding decision steps, the process proceeds to step #40-7.

The display data decision process is largely divided into two parts: one before step #40-40 and the other after step #40-42. As seen from the routine of the controller 1 shown by the flowchart of FIGS. 7A and 7B, the former part relates to the display data sent to the display IC 2 when the camera is operating triggered by a switch operation or such. The latter part relates to the display data generated when no active operation is made in the camera, such as the main switch off display data at step #3, or the display data sent after step #39 where no operation is made after the set switch $S_{SET}$ is determined to be off at step #16. Therefore, after the display process of the former part (steps #40-4 to #40-41) has finished, step #40-7 is executed to reset or stop the one-hour timer, whereby the display of the dot matrix part 16 is continued irrespective of the display duration time. On the other hand, after the process of the latter part (steps #40-42 to #40-51), the step #40-7 is not executed but the one-hour timer is started at step #40-48, or, if the timer has been already started, continues counting, followed by step #40-1, whereby the dot matrix part 16 ceases after the display duration time, as shown in FIGS. 8Y and 8Z, to save the battery energy.

As shown in the above embodiment, an analog scale of the film speed is displayed in the dot matrix part 16, and the automatically-set DX film speed is placed at the center indicated by the square mark. Then, when the film speed is manually set, the manually-set film speed is indicated by the index mark along the analog scale, whereby the difference between the automatically-set value and the manually-set value is apparent. Since the scale is indicated by the unit of Ev which is the same as that used in the exposure override setting (FIG. 8O), the film speed difference is readily comparable to the exposure override value. This enables the photographer to expect the effect of the his film speed setting on the exposure condition of the picture.

Figure 19A:
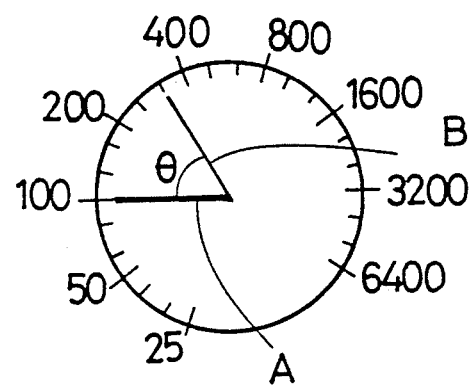
FIGS. 19A through 19C are three other examples of the analog scale for showing the film speed setting.
Figure 19B:
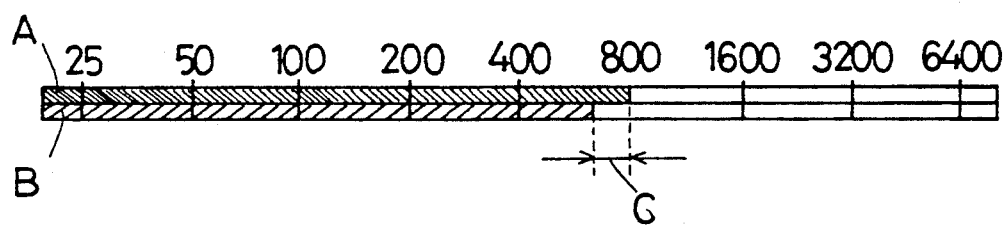
Figure 19C:

The automatically-set film speed and the manually-set film speed are shown by different marks along the linear scale in the above embodiment. But the film speed indication can be different. As shown in FIGS. 19A, 19B and 19C, the automatically-set value and the manually-set value may be both indicated by the same analog scale.

In FIG. 19A, the film speed scale is a clock type. Automatically-set value (100 ISO in FIG. 19A) is indicated by the thicker arm A and the manually-set value (320 ISO) is indicated by the thinner arm B. The difference is apparent by the angle $\theta$ between them. The arm can be reversed, of course, and the difference in arm thickness may be replaced by colors.

In FIG. 19B, both values are indicated by linearly extending bars. The upper bar A indicates the automatically-set value (800 ISO) and the lower bar B indicates the manually-set value (640 ISO). The difference C is still apparent here. If the colors of the bars are set different, the difference may be clearer.

In FIG. 19C, the manually-set value (250 ISO) is indicated by the numerals in the center box A, and the difference B of the manually-set value from the automatically-set value is indicated by the bars extending to the left (the difference is minus) and right (the difference is plus) of the box. In FIG. 19C, the manually-set value is larger than the automatically-set value by +(4/3)Ev.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as being included therein.

What is claimed is:

1. A camera comprising:
    means for changing the state of said camera among a first state in which said camera is in an OFF state, a second state in which said camera is in an ON state without substantial power consumption to hold said camera in operation, and a third state in which said camera is in an ON state consuming power to hold said camera in operation;
    means for displaying photographic information of said camera, said displaying means including first display means for displaying the information by means of a plurality of display segments and second display means for displaying the information by means of a dot matrix; and
    means responsive to said changing means for controlling said displaying means so as to only turn on the first display means when the camera is in the second state.

2. A camera according to claim 1, wherein said changing means is a manually operable member.

3. A camera according to claim 1, wherein said controlling means controls said displaying means so as to turn on both of the first and second display means when said camera is in the third state.

4. A camera according to claim 1, wherein said controlling means includes means for counting a predetermined time period since said camera is changed into the second state by said changing means and said controlling means controls said displaying means so as to turn off the second display means after the predetermined period.

5. A camera comprising:
    means for changing the state of said camera among a first state in which said camera is in an OFF state, a second state in which said camera is in an ON state without substantial power consumption to hold said camera in operation, and a third state in which said camera is in an ON state consuming power to hold said camera in operation;
    means for displaying photographic information of said camera, said displaying means including first display means for displaying the information by means of a plurality of display segments and second display means for displaying the information by means of a dot matrix; and
    means responsive to said changing means for controlling said displaying means so as to only turn on the first display means when the camera is in the first state.

6. A camera according to claim 5, wherein said changing means is a manually operable member.

7. A camera according to claim 8, wherein said controlling means includes means for counting a predetermined time period since said camera is changed into the first state by said changing means and said controlling means controls said displaying means so as to turn off the second display means after the predetermined period.

8. A camera comprising:
    means for changing the state of said camera among a first state in which said camera is in an OFF state, a second state in which said camera is in an ON state without substantial power consumption to hold said camera in operation, and a third state in which said camera is in an ON state consuming power to hold said camera in operation;
    means for displaying photographic information of said camera, said displaying means including first display means and second display means different from the first display means;
    means for driving said displaying means wherein said driving means drives the first display means by using a first method of driving and drives the second display means by using a second method of driving different from the first method; and
    means for controlling said displaying means so as to turn on at least one of the first and second display means in response to said changing means.

9. A camera according to claim 8, wherein said driving means drives the first display means with a first duty ratio under the first method and drives the second display means with a second duty ratio under the second method different from the first duty ratio.

10. A camera according to claim 8, wherein said changing means is a manually operable member.

11. A camera according to claim 8, wherein said controlling means controls said displaying means so as to turn on only one of the two display means when said camera is in the second state.

12. A camera according to claim 8, wherein said controlling means controls said displaying means so as to turn on only one of the two display means when said camera is in the first state.

13. A camera according to claim 8, wherein said controlling means controls said displaying means so as to turn on both of the first and second display means when said camera is in the third state.

14. A camera according to claim 8, wherein said controlling means includes means for counting a predetermined time period since the state of said camera is changed by said changing means and said controlling means controls said displaying means so as to turn off one of the two display means after the predetermined period.

* * * * *

UNITED STATES PATENT AND TRADEMARK OFFICE
CERTIFICATE OF CORRECTION

PATENT NO. : 5,218,399
DATED : June 8, 1993
INVENTOR(S) : Shuji Izumi, et al.

It is certified that error appears in the above-identified patent and that said Letters Patent is hereby corrected as shown below:

In Col. 9, line 31, change "ever" to --every--.

In Col. 20, line 9 (claim 7, line 1), change "claim 8" to --claim 5--.

Signed and Sealed this

First Day of February, 1994

Attest:

BRUCE LEHMAN

Attesting Officer

Commissioner of Patents and Trademarks